US012683275B2

(12) United States Patent
Fujii

(10) Patent No.: US 12,683,275 B2
(45) Date of Patent: Jul. 14, 2026

(54) DISTANCE ESTIMATION DEVICE, ANTENNA DEVICE, FEED SYSTEM, FEED DEVICE, AND FEED METHOD

(71) Applicant: MINEBEA MITSUMI Inc., Nagano (JP)

(72) Inventor: Masaaki Fujii, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 337 days.

(21) Appl. No.: 18/292,577

(22) PCT Filed: Mar. 25, 2022

(86) PCT No.: PCT/JP2022/014526
§ 371 (c)(1),
(2) Date: Jan. 26, 2024

(87) PCT Pub. No.: WO2023/013160
PCT Pub. Date: Feb. 9, 2023

(65) Prior Publication Data
US 2024/0356215 A1      Oct. 24, 2024

(30) Foreign Application Priority Data

Aug. 2, 2021    (JP) ................................. 2021-126777

(51) Int. Cl.
*H01Q 3/36*          (2006.01)
*G06T 7/50*          (2017.01)
(Continued)

(52) U.S. Cl.
CPC ................. *H01Q 3/36* (2013.01); *G06T 7/50* (2017.01); *G06T 7/66* (2017.01); *G06T 7/73* (2017.01);
(Continued)

(58) Field of Classification Search
CPC . H01Q 3/36; H01Q 1/28; G06T 7/246; G06T 7/73; G06T 2207/30204; G06T 2207/30244; G01B 11/00
See application file for complete search history.

(56) References Cited

U.S. PATENT DOCUMENTS

| | | | |
|---|---|---|---|
| 10,911,103 B2 * | 2/2021 | Carter .................. | H04B 7/0619 |
| 2015/0370250 A1 * | 12/2015 | Bachrach ............... | G01C 23/00 |
| | | | 701/2 |
| 2022/0021112 A1 | 1/2022 | Fujii | |

FOREIGN PATENT DOCUMENTS

| | | |
|---|---|---|
| JP | H02-251713 | 10/1990 |
| JP | 2004-212213 | 7/2004 |

(Continued)

OTHER PUBLICATIONS

International Preliminary Report on Patentability for PCT/JP2022/014526 mailed on Feb. 15, 2024.

(Continued)

*Primary Examiner* — Vladimir Magloire
*Assistant Examiner* — Peter Davon Doze
(74) *Attorney, Agent, or Firm* — IPUSA, PLLC

(57) ABSTRACT

A distance estimation device includes circuitry that estimates a distance between an image acquiring device and a marker in a first axis direction, based on coordinates of an upper end portion and a lower end portion of the marker and a length between the upper end portion and the lower end portion.

20 Claims, 12 Drawing Sheets

(51) Int. Cl.
   *G06T 7/66*          (2017.01)
   *G06T 7/73*          (2017.01)
   *H01Q 1/22*          (2006.01)

(52) U.S. Cl.
   CPC ..... *H01Q 1/22* (2013.01); *G06T 2207/30204*
                  (2013.01); *G06T 2207/30244* (2013.01)

(56)                References Cited

FOREIGN PATENT DOCUMENTS

| | | | |
|---|---|---|---|
| JP | 2016-101036 | 5/2016 | |
| JP | 2019-135900 | 8/2019 | |
| JP | 2020-136918 | 8/2020 | |
| WO | 2018/142533 | 8/2018 | |
| WO | WO-2018142533 A1 * | 8/2018 | ............. G01C 21/28 |

OTHER PUBLICATIONS

International Search Report for PCT/JP2022/014526 mailed on Jun. 7, 2022.

* cited by examiner (B)

DISTANCE ESTIMATION DEVICE, ANTENNA DEVICE, FEED SYSTEM, FEED DEVICE, AND FEED METHOD

TECHNICAL FIELD

The present invention relates to a distance estimation device, an antenna device, a feed system, a feed device, and a feed method.

BACKGROUND

There has been a wireless power transmitter, and the wireless power transmitter includes a beam transmitter that transmits a feed energy beam to a wireless power receiver that is mounted on an airplane, an information acquiring unit that acquires control information for increasing power reception efficiency of the wireless power receiver, and a controller that controls the energy beam based on the control information so as to increase the power reception efficiency of the wireless power receiver. As a power transmitting antenna, the use of an array antenna is described (see Patent Document 1, for example).

RELATED-ART DOCUMENTS

Patent Document

Patent Document 1: Japanese Unexamined Patent Application Publication No. 2019-135900

SUMMARY

Problem to be Solved by the Invention

When power is transmitted by the multiple antennas in the array antenna, and then the wireless power receiver receives the power that is transmitted from multiple antenna elements of the array antenna, in a case where the wireless power receiver is mounted on an airplane as in the conventional wireless power transmitter, there is a sufficient distance between the wireless power transmitter (feed device) and the wireless power receiver (power receiver). With this arrangement, a distance difference between the multiple antenna elements and the power receiver is provided to the extent to which the distance difference is negligible. In this case, even when the power is transmitted by the multiple antenna elements to the same target, a smaller phase shift occurs when the power receiver receives the power, and thus a problem is unlikely to occur.

However, when the distance between the power receiver and the feed device is a short distance of about several meters, in a case where the power is transmitted from the multiple antenna elements to the same target, a difference between power transmission distances that are obtained in a case where the power receiver receives the power is large, and thus an increased phase shift occurring when the power receiver receives the power is increased. Therefore, there may be a problem in that a combination of received power is reduced.

In order to solve the problem, it is desirable to identify a distance between the power receiver and the feed device in real time so that phases of transmission power signals transmitted by multiple antenna elements are adjusted to match received power phases.

Therefore, an object is to provide a distance estimation device, an antenna device, a feed system, a feed device, and a feed method that are capable of estimating the distance between the power receiver and the feed device in real time.

Means to Solve the Problem

A distance estimation device according to an embodiment of the present invention includes an image acquiring unit configured to acquire an image through a fisheye lens; a position deriving unit configured to convert a first position of a marker that is included in the image acquired by the image acquiring unit, into a second position of polar coordinates on a first plane that includes a first axis and a second axis, the first position being used in the image acquiring unit; and a distance estimating unit configured to estimate a distance between the image acquiring unit and the marker. The distance estimating unit is configured to estimate the distance between the image acquiring unit and the marker in a first axis direction, based on, coordinates of an upper end portion of the marker, the coordinates being determined based on a second elevation angle and an azimuth angle of the upper end portion of the marker included in the image, the second elevation angle being relative to a third axis, and the azimuth angle being relative to the first axis; coordinates of a lower end portion of the marker, the coordinates of the lower end portion being determined based on a third elevation angle and an azimuth angle of the lower end portion of the marker included in the image, the third elevation angle being relative to the third axis, and the azimuth angle of the lower end portion being relative to the first axis; and a length between the upper end portion and the lower end portion.

Effects of the Invention

A distance estimation device, an antenna device, a feed system, a feed device, and a feed method that are capable of estimating a distance between a power receiver and the feed device in real time can be provided.

BRIEF DESCRIPTION OF THE DRAWINGS

FIG. 10 is a diagram for describing the relation between a power-transmitting start angle $\theta_{START}$ and a travel distance W in hat notation.

DESCRIPTION OF EMBODIMENTS

Embodiments to which a distance estimation device, an antenna device, a feed system, a feed device, and a feed method of the present invention are applied are described below.

Embodiments

Figure 1:
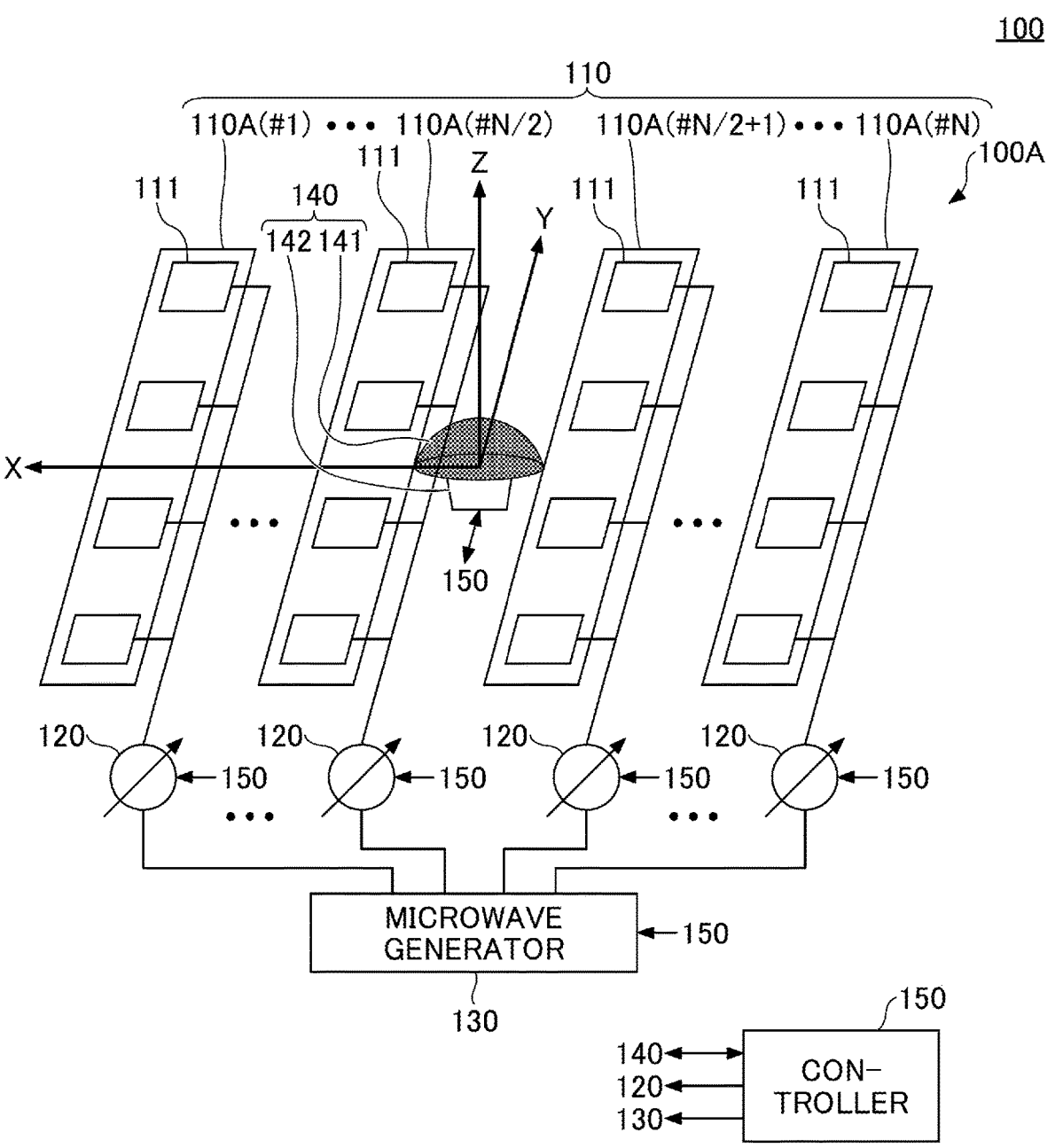
FIG. 1 is a diagram illustrating a feed device 100 according to an embodiment.

FIG. 1 is a diagram illustrating a feed device 100 according to the embodiment. The feed device 100 includes an array antenna 110, phase shifters 120, a microwave generator 130, a camera 140, and a controller 150. An antenna device 100A according to the embodiment is obtained by removing the microwave generator 130 from the feed device 100.

In the following description, an XYZ coordinate system is used. A plan view refers to an XY plan view. An X-axis is an example of a first axis, a Y-axis is an example of a second axis, and a Z-axis is an example of a third axis. The XY plane is an example of a first plane, and an XZ plane is an example of a second plane.

For example, the array antenna 110 is divided into N subarrays 110A. The first (#1) to the N-th (#N) subarrays 110A in the N subarrays are illustrated. #1 to #N express coordinates of the N subarrays 110A in the X-axis direction. Here, N is an integer greater than or equal to 2, and in FIG. 1, a manner in which N is an even number greater than or equal to 4 is illustrated. The N subarrays 110A are arranged in an X-axis direction (first axis direction), and each subarray 110A includes four antenna elements 111, for example. In this arrangement, the array antenna 110 includes 4N antenna elements 111, for example. Each array antenna 110 extends in a Y-axis direction (second axis direction). The antenna elements 111 are patch antennas each of which has a rectangular shape in a plan view. The array antenna 110 may include a ground plate that is held at a ground potential and is on a negative Z-axis side of the antenna elements 111. In an example, a center of a position of the 4N antenna elements 111 coincides with the origin of the XYZ coordinate system. In addition, it is sufficient when the number of antenna elements 111 included in each subarray 110A is two or more, and it is sufficient when these antenna elements are bidimensionally arranged.

Figure 2:
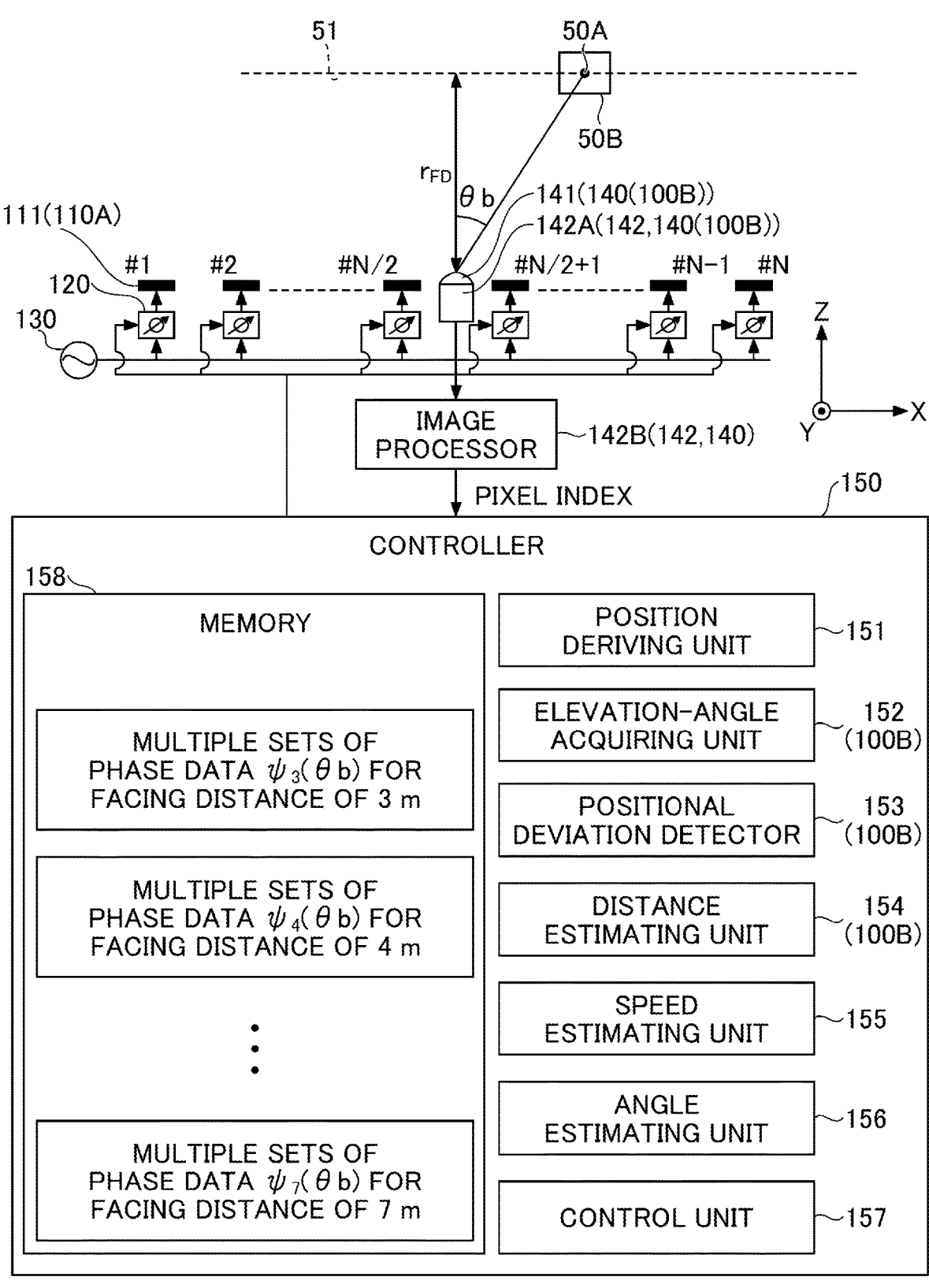
FIG. 2 is a diagram illustrating the feed device 100 according to the embodiment.

The description will be provided below with reference to FIG. 2 in addition to FIG. 1. FIG. 2 is a diagram illustrating the feed device 100 according to the embodiment. FIG. 2 illustrates a simplified configuration of the proximal portion of each phase shifter 120, as in FIG. 1. Although the origin of the XYZ coordinate system is shifted in FIG. 2 for purposes of facilitating the visualization of the figure, the description will be provided below on the assumption that the origin of the XYZ coordinate system coincides with the center of the position of the 4N antenna elements 111 as illustrated in FIG. 1. FIG. 2 illustrates antenna elements 111 in the respective subarrays 110A that are disposed in a negative Y-axis direction with respect to the X-axis. FIG. 2 also illustrates components included in the controller 150, a marker 50A, and a power receiver 50B. The marker 50A and the power receiver 50B are fixed to an inner wall 51 of a tunnel, for example. The inner wall 51 of the tunnel is an example of a wall, and an interior of the tunnel is an example of a space at which the marker 50A disposed along the inner wall 51 exists. In an example, the antenna device 100A and the feed device 100, which are mounted on a working vehicle, travel in the tunnel, while detecting the marker 50A that is attached to the inner wall 51 of the tunnel, and then the antenna device 100A and the feed device 100 transmit power to the power receiver 50B.

In FIG. 2, the marker 50A is present toward a direction that is defined using an angle θb relative to the Z-axis in a XZ plan view. In FIG. 2, the XYZ coordinate system is shifted for convenience of description. However, the origin of the XYZ coordinate system coincides with the center of the position of the 4N antenna elements 111, and thus the angle θb is an angle between a straight line that connects the origin of the XYZ coordinate system and the marker 50A on the XZ plane, and the Z-axis. When the XZ plane is viewed from the positive Y-axis direction, the angle θb indicates a positive value in a case where the angle θb points toward a positive X-axis direction. In contrast, the angle θb indicates a negative value in a case where the angle θb points toward a negative X-axis direction.

In this description, a distance estimation device 100B according to the embodiment includes the camera 140, an elevation-angle acquiring unit 152, a positional deviation detector 153, and a distance estimating unit 154 of the controller 150. The distance estimation device 100B is a device that estimates a distance between the camera 140 and the marker 50A. In FIG. 2, the camera 140, and the elevation-angle acquiring unit 152, the positional deviation detector 153, and the distance estimating unit 154, which are included in the distance estimation device 100B, are denoted by reference numeral 100B in parentheses.

A feed system according to the embodiment includes the antenna device 100A, the microwave generator 130, the marker 50A, and the power receiver 50B. The feed system is a system in which transmission power signals of microwaves, generated by the microwave generator 130, are transmitted by the antenna device 100A to the power receiver 50B. The feed system is described below with reference to FIG. 12. A method executed by the feed device 100 to power the power receiver 50 is a feed method according to the embodiment.

N phase shifters 120 are respectively provided to correspond to the N subarrays 110A, and the N phase shifters 120 are coupled to antenna elements 111 of the N subarrays 110A. The phase shifter 120 is an example of a phase adjustor that adjusts a phase, and is an example of the phase shifter. In each subarray 110A, four antenna elements 111 are coupled in parallel to one phase shifter 120.

In each subarray 110A, transmission power signals in the same phase are respectively supplied to the four antenna elements 111. Phases of the transmission power signals that the N phase shifters 120 output to the N subarrays 110A, respectively, are different from one another. In this arrangement, an angle (elevation angle) of a beam that is formed by radio waves emitted by the 4N antenna elements 111 can be controlled in the XZ plane.

The beam formed by the radio waves emitted by the 4N antenna elements 111 is synonymous with the beam output from the array antenna 110. The beam output from the array antenna 110 is synonymous with the beam output from each of the antenna device 100A and the feed device 100.

The microwave generator 130 is coupled to the N phase shifters 120, and supplies a microwave of predetermined power. The microwave generator 130 is an example of a radio wave generator. A frequency of the microwave is, for example, a frequency in a 920 MHz band. A manner in which the feed device 100 includes the microwave generator 130 is described in this description, but the microwave is not limiting. It is sufficient when a radio wave at a predetermined frequency is used.

The camera 140 is arranged between an (N/2)-th subarray 110A and an (N/2+1)-th subarray 110A in the X-axis direction. The camera 140 is arranged between a second antenna element 111 and a third antenna element 111 in the positive Y-axis direction, among the four antenna elements 111 that are included for each subarray in the Y-axis direction. The camera 140 includes a fisheye lens 141 and a camera body 142. The camera 140 is an example of an image acquiring unit. In FIG. 2, the camera body 142 is illustrated for a capturing unit 142A and an image processor 142B separately.

The fisheye lens 141 is a lens that employs equidistant projection. In an example, a central position of the fisheye lens 141 coincides with each of a center of the 4N antenna elements 111 and the origin of the XYZ coordinate system. The camera body 142 is a portion of the camera 140 other than the fisheye lens 141. The camera body 142 may include a camera with a complementary metal oxide semiconductor (CMOS) image sensor, or may include an infrared camera.

The camera 140 acquires an image including the marker 50A through the fisheye lens 141, and outputs image data to the controller 150. The marker 50A is attached to the power receiver 50B with a power receiving antenna that is a target to be irradiated with the beam output from the antenna device 100A and the feed device 100. The antenna device 100A and the feed device 100 determine a position of the marker 50A included in the image that is acquired by the camera 140, and emits the beam toward the power receiver 50B.

The camera body 142 includes the capturing unit 142A and the image processor 142B. The capturing unit 142A includes an imaging element, and is a portion that acquires the image data by capturing the image through the fisheye lens 141. The image processor 142B performs image processing, such as binarization, on the image acquired by the capturing unit 142A, and outputs a pixel index to the controller 150. The pixel index is an XY-coordinate value (address) indicating the position of the marker 50A on an imaging screen.

The image processor 142B performs a process of determining one or more contours of the marker 50A, a process of determining the largest contour, and a process of reading coordinates of an upper end and a lower end of the marker 50A. The image processor 142B outputs the coordinates of the upper end and the lower end of the marker 50A to the controller 150.

The process of determining the contours of the marker 50A is a process of extracting one or more contours based on the distribution of pixel indexes that are obtained by binarizing the image that is acquired by the capturing unit 142A.

The process of determining the largest contour is a process of determining the largest contour among one or more contours that are extracted based on the distribution of the pixel indexes (process of extracting the largest contour by counting the number of pixels in the contour). By determining the largest contour, the effect of noise or the like can be avoided.

The process of reading the coordinates of the upper end and the lower end of the marker 50A is a process of reading the coordinates of the upper end and the lower end, based on the largest contour determined in the process of determining the largest contour. The image processor 142B outputs the read coordinates of the upper end and the lower end of the marker 50A to the controller 150.

The controller 150 includes a position deriving unit 151, an elevation-angle acquiring unit 152, a positional deviation detector 153, a distance estimating unit 154, a speed estimating unit 155, an angle estimating unit 156, a control unit 157, and a memory 158. The controller 150 is implemented by a computer that includes a CPU (central processing unit) and a memory. Functions of the position deriving unit 151, the elevation-angle acquiring unit 152, the positional deviation detector 153, the distance estimating unit 154, the speed estimating unit 155, the angle estimating unit 156, and the control unit 157, implemented by a program that the controller 150 executes, are expressed by respective functional blocks. The memory 158 functionally expresses a memory in the controller 150.

Figure 3:
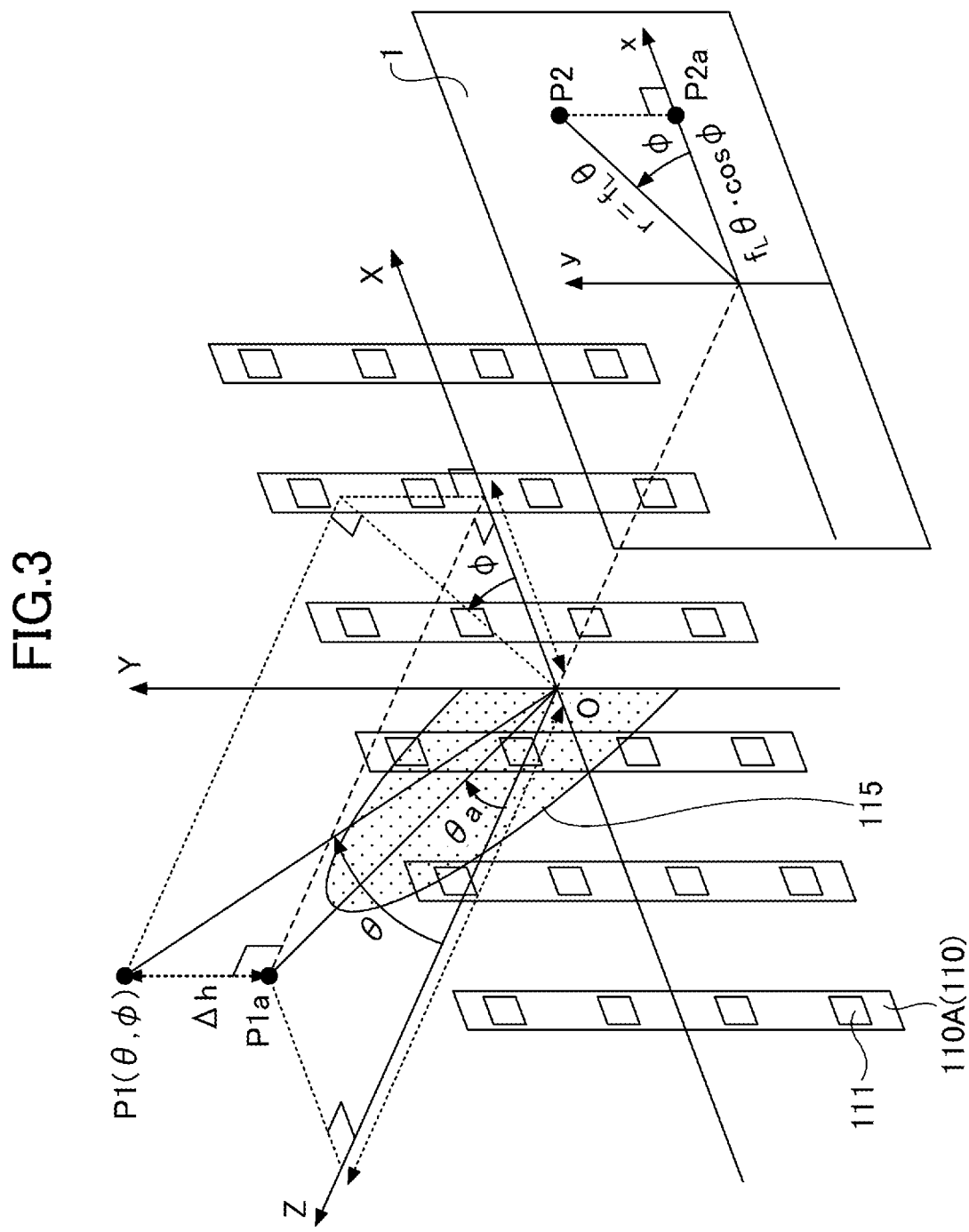
FIG. 3 is a diagram illustrating a polar coordinate system of an array antenna 110.

The position deriving unit 151, the elevation-angle acquiring unit 152, the positional deviation detector 153, the distance estimating unit 154, the speed estimating unit 155, the angle estimating unit 156, the control unit 157, and the memory 158 are described below with reference to FIG. 3 in addition to FIGS. 1 and 2. FIG. 3 is a diagram illustrating a polar coordinate system of the array antenna 110. In FIG. 3, the subarrays 110A of the array antenna 110 in the feed device 100, the antenna elements 111 included in the subarrays 110A, and a beam 115 that is output from the array antenna 110 are illustrated, and components other than the above components are omitted. In FIG. 3, the polar coordinate system on a plane 1 that is parallel to the XY plane is illustrated. The plane 1 is an xy-plane of image data that is acquired the capturing acquiring unit 142A, and the plane 1 corresponds to an xy-plane that is defined by pixel indexes output from the image processor 142B. The x-axis and the y-axis are parallel to the X-axis and the Y-axis that are used in the XYZ coordinates, and orientation of the x-axis and the y-axis is the same as that of the X-axis and the Y-axis.

The position of the marker 50A in the XYZ coordinate system is expressed as P1. An elevation angle and an azimuth angle that are derived from a line segment that connects the origin O and the position P1 are expressed as $\theta$ and $\varphi$, respectively. The elevation angle is an angle relative to the positive Z-axis direction, and the azimuth angle is an angle relative to the positive X-axis direction. A clockwise direction that is obtained in a plan view viewed from the positive Z-axis direction is expressed using a positive value. The elevation angle derived from a line segment connecting a position P1a, obtained by projecting the position P1 onto the XZ plane, and the origin O is expressed as $\theta a$. The elevation angle $\theta a$ is an angle that is approximately obtained by projecting the elevation angle $\theta$ onto the XZ plane, when the position of the marker 50A is close to the XZ plane. As in an angle $\theta b$, when the XZ plane is viewed from the positive Y-axis direction, the elevation angle $\theta a$ indicates a positive value in a case where the elevation angle $\theta a$ points toward the positive X-axis direction. Also, the elevation angle $\theta a$ indicates a negative value in a case where the elevation angle $\theta a$ points toward the negative X-axis direction.

The position P1 is an example of a first position, and the position P1a is an example of a projected position. The origin O is an example of a reference point of the XYZ coordinate system.

The antenna device 100A and the feed device 100 control the elevation angle of the beam 115 output from the array antenna 110, by using only the XZ plane. This assumes that the array antenna 110 performs in-phase feeding with respect to the Y-axis direction so that the beam is fixed in the Y-axis direction, that the resulting beam can be emitted toward an elevation direction in which 0 degrees are set with respect to the Z-axis, and that the position of the power receiver 50B is not so deviated from the XZ plane (for example, the elevation angle relative to the Z-axis of the YZ plane is approximately in the range of ±30 degrees). This is because in a case where the power receiver 50B is situated at the position described above, only by controlling the elevation angle of the beam 115 in the XZ plane, the beam 115 can be efficiently emitted toward the power receiver 50B, and the size of a given control unit in the array antenna 110 is reduced.

The position deriving unit 151 calculates a center of gravity of the image of the marker 50A, based on the pixel index output from the image processor 142B. The pixel index output from the image processor 142B expresses an image obtained by equidistant projection that is performed through the fisheye lens 141. In such image processing, the position P1 that is of the marker 50A included in the image acquired by the camera 140, and that is used in the array antenna 110 is converted into a position P2 that is defined by polar coordinates of the XY plane 1. In this arrangement, the position deriving unit 151 derives the position P2. The position P2 is a position of the center of gravity, calculated by the position deriving unit 151. The position P2 is an example of a second position.

The position P2 is expressed by a radius vector r from the origin O and a deflection angle $\varphi$. When a focal length of the fisheye lens 141 is expressed as $f_L$, the radius vector r is expressed by $r = f_L \theta$. The deflection angle $\varphi$ is the same as the azimuth angle $\varphi$. By the image processing described above, the position deriving unit 151 determines $r \cdot \cos \varphi$ that is obtained by mapping the radius vector r onto the X-axis. The position deriving unit 151 outputs data indicating the position P2 to the elevation-angle acquiring unit 152.

The elevation-angle acquiring unit 152 acquires (calculates), as the elevation angle $\theta a$, a value $(r \cdot \cos \varphi / f_L)$ that is obtained by dividing an X-coordinate $(r \cdot \cos \varphi)$ of a mapped position P2 that is obtained by mapping a position P2a onto the X-axis, by the focal distance $f_L$ of the fisheye lens 141. The reason why the elevation angle $\theta a$ can be acquired in this manner will be described below. The elevation-angle acquiring unit 152 outputs the elevation angle $\theta a$ to the distance estimating unit 154 and the control unit 157.

The positional deviation detector 153 determines a shape, and a center of gravity, of the marker 50A, based on the pixel index output from the image processor 142B, and detects a positional deviation between the camera 140 and the marker 50A in the Y-axis direction, based on the position of the center of gravity of the marker 50A that is present in a region. The position of the center of the fisheye lens 141 coincides with each of the center of the 4N antenna elements 111 and the origin of the XYZ coordinate system, for example. In this arrangement, it is sufficient when a position of the center of the gravity in the Y-axis direction, obtained in a case where there is no positional deviation between the camera 140 and the marker 50A is given as Y=0, for example. If a position of the determined center of the gravity of the marker 50A in the region in the Y-axis direction is given as Y=0, the positional deviation detector 153 determines that there is no positional deviation between the camera 140 and the marker 50A. Also, if the position of the determined center of the gravity of the marker 50A that is present in the region in the Y-axis direction is not given as Y=0, the positional deviation detector 153 determines that there is a positional deviation between the camera 140 and the marker 50A, and thus detects that the positional deviation occurs. The positional deviation detector 153 outputs a result of the detection to the distance estimating unit 154.

The position of the center of the gravity may be acquired by the position deriving unit 151.

When the elevation angle $\theta a$ calculated by the elevation-angle acquiring unit 152 is zero degrees (0 degrees), the distance estimating unit 154 estimates a distance between the center of the fisheye lens 141 and the marker 50A, based on the number of pixel indexes output from the image processor 142B in the camera 140. The elevation angle $\theta a$ of 0 degrees means that the marker 50A exists in front of the fisheye lens 141 in the Z-axis direction (the center of the gravity of the marker 50A exists on the Z-axis).

The distance estimating unit 154 estimates a facing distance rep that is from the center of the fisheye lens 141 to the marker 50A, in a case where the elevation angle $\theta a$ is 0 degrees. The case where the elevation angle $\theta a$ is 0 degrees is an example of a case where the elevation angle $\theta a$ is in a predetermined angle range including 0 degrees. The facing distance $r_{FD}$ is a distance that is obtained in a case where the marker 50A faces the camera 140 on the Z-axis.

For example, for each of different distances by which the camera 140 and the marker 50A are separated on the Z-axis, the number of binarized pixel indexes that are acquired by the image processor 142B is stored in the memory 158 in advance. Further, in a case where the elevation angle $\theta a$ is zero degrees (0 degrees), the distance estimating unit 154 counts the number of pixel indexes output from the image processor 142B of the camera 140, and then the distance estimating unit 154 compares a counted value with multiple reference values that correspond to respective facing distances $r_{FD}$ stored in the memory 158, to thereby estimate the facing distance rep from the center of the fisheye lens 141 to the marker 50A, in the case where the elevation angle $\theta a$ is 0 degrees. The number of pixel indexes varies depending on the facing distance reo, and thus the facing distance $r_{FD}$ can be estimated based on the number of pixel indexes.

When the elevation angle $\theta a$ is zero degrees (0 degrees), in a case where the pixel index is output from the image processor 142B of the camera 140 a plurality of times, the facing distance $r_{FD}$ is sufficiently estimated based on an average of the numbers of pixel indexes.

In addition, when the positional deviation between the camera 140 and the marker 50A occurs in a case where the fisheye lens 141 is used, the number of pixel indexes is reduced in comparison to a case where the positional deviation between the camera 140 and the marker 50A does not occur, even when the same facing distance $r_{FD}$ is obtained. In this arrangement, under a condition in which the positional deviation detector 153 determines that there is a positional deviation between the camera 140 and the marker 50A in the Y-axis direction, it is sufficient when the distance estimating unit 154 estimates the facing distance $r_{FD}$ by using the number of pixel indexes that are obtained by making a correction in accordance with the extent to which the positional deviation occurs in the Y-axis direction, where the distance estimating unit 154 preset stores, in the memory 158, data indicating the extent to which the number of pixel indexes varies.

If the elevation angle $\theta a$ is in a predetermined angle range including 0 degrees, the distance estimating unit 154 estimates the distance $r_{FD}$ by the above-described estimation method. In contrast, if the elevation angle $\theta a$ is not in the predetermined angle range including 0 degrees, the distance estimating unit 154 estimates a distance X and a facing distance Z in real time by an estimation method that differs from the above method. The distance X and the facing distance Z respectively have an X-component and a Z-component of a distance that is from the center of the fisheye lens

141 to the marker 50A. A case where the distance X and the facing distance Z are estimated in real time means that when the elevation angle θa is not in the predetermined angle range including 0 degrees, the distance X and the facing distance Z is estimated in real time in accordance with the current elevation angle θa. The above facing distance $r_{FD}$ can be estimated only in a case where the elevation angle θa is zero degrees (0 degrees), while the distance X and the facing distance Z can be estimated in a case where various angles that are not in the predetermined angle range including 0 degrees are each used as the elevation angle θa. In this arrangement, the distance X and the facing distance Z can be estimated in real time. A method for estimating the distance X and the facing distance Z will be described below with reference to FIG. 7.

The speed estimating unit 155 estimates the travel speed of the feed device 100 in the X-axis direction with respect to the marker 50A, by acquiring distances X in hat notation that the distance estimating unit 154 estimates at time intervals. The speed estimating unit 155 outputs data indicating the estimated travel speed to the angle estimating unit 156. A method for estimating the travel speed will be described below with reference to FIG. 7.

The angle estimating unit 156 estimates the power-transmitting start angle that is identified at a timing at which power transmission is started, based on the facing distance Z in hat notation estimated by the distance estimation unit 154 and, the travel speed estimated by the speed estimating unit 155. Similar to the elevation angle θa, the power-transmitting start angle indicates an angle of the marker 50A with respect to the Z-axis when viewed from the origin O of the XYZ coordinate system in the XZ-plane. The angle estimating unit 156 outputs data indicating the estimated power-transmitting start angle to the control unit 157.

The control unit 157 controls an amount (adjustment amount) of phase shift that is performed by each phase shifter 120, such that the direction of the beam 115, emitted by the array antenna 110, defines the elevation angle θa in the XZ plane. The elevation angle θa is acquired by the elevation-angle acquiring unit 152. In addition, the control unit 157 controls the output of the microwave generator 130, and controls the capturing or the like to be performed through the camera 140. When the elevation angle θa matches the angle-transmitting start angle estimated by the angle estimating unit 156, the control unit 157 starts the power transmission. The starting of the power transmission will be described below with reference to FIG. 7.

When the control unit 157 controls the amount of phase shift performed by each phase shifter 120, a specific control will be performed as follows. The control unit 157 retrieves, from the memory 158, phase data that is in association with the facing distance Imp estimated by the distance estimating unit 154, and the elevation angle θa acquired by the elevation-angle acquiring unit 152. Then, the control unit 157 controls amounts of the phase shift for the N phase shifters 120, based on the retrieved phase data. The facing distance $r_{FD}$ estimated by the distance estimating unit 154 includes a given facing distance $r_{FD}$ estimated by the distance estimating unit 154 in either a case where the elevation angle θa is in the predetermined angle range including 0 degrees or a case where the elevation angle θa is not in the predetermined angle range including 0 degrees.

Here, in order for the power receiving antenna of the power receiver 50B to efficiently receive the power, it is ideal that phases of the transmission power signals, obtained when the power from the N subarrays 110A is received by the power receiving antenna of the power receiver 50A, are identical. The antenna device 100A and the feed device 100 transmit the power of the transmission power signals to the power receiver 50B that is located, for example, at a short distance from 3 m to about 7 m. When the power is transmitted to the power receiver 50B that is attached to an inner wall 51 in a tunnel, a distance between the array antenna 110 and the power receiver 50B is, for example, about 3 m to about 5 m, under a condition in which the angle θb is 0 degrees.

The power is assumed to be transmitted at such a short distance, and thus a relative difference between distances that are from the respective N subarrays 110A to the power receiving antenna of the power receiver 50B is relatively large. In this case, when the N subarrays 110A transmit the power to the same target, phases of the transmission power signals that are received by the antenna of the power receiver 50B from the N subarrays 110A are not matched, and thus the power receiver 50B cannot efficiently receive the power. The difference between distances that are each from a corresponding subarray, among the N subarrays 110A, to the antenna of the power receiver varies depending on the angle θb and the distance between the corresponding subarray and the power receiving antenna of the power receiver, in the Z-axis direction.

In view of the situation describe above, each of the antenna device 100A and the feed device 100 uses phase data used to adjust phases that are obtained when the N subarrays 110A transmit the power, so as to match the phases of the transmission power signals that are from the N subarrays 110A and then are received by the power receiving antenna of the power receiver. The phase data indicates a shift amount (adjustment amount). In an example, assuming that power is transmitted in a case where elevation angle θa is changed from +70 degrees to −70 degrees in accordance with the movement of the antenna device 100A and the feed device 100, multiple sets of phase data are prepared to adjust amounts of phase shift that are performed through the N subarrays 110A, and each amount of phase shift is set in increments of 1 degrees. Each phase data includes shift amounts for the N phases to be set by the N phase shifters 120 that are respectively coupled to the N subarrays 110A, in a case where a given elevation angle θa is set. The sets of phase data, namely 141 sets of phase data, are prepared for a given facing distance $r_{FD}$, and the phase data is set in increments of 1 degree within the range of angles θb of +70 degrees to −70 degrees. In order to adjust the shift amounts for the phases for the N subarrays 110A in accordance with each of the facing distances $r_{FD}$, the sets of phase data are prepared for the respective facing distances $r_{FD}$. The phase data is data that is created based on the angle θb, and thus the sets of phase data from $\psi_3$ (θb) to $\psi_7$ (θb) are illustrated using θb in FIG. 2. It is sufficient when the control unit 157 uses the multiple sets of phase data that are obtained in a case where the angle θb is equal to the elevation angle θa. Each of phase data from $\psi_3$ (θb) to $\psi_7$ (θb) includes shift amounts θs #1~θs #N, corresponding to the coordinates (#1 to #N) of the N subarrays 110A. For example, a shift amount θs #1 among the shift amounts θs #1 to θs #N that are included in the phase data $\psi_3$ (θb) is used for the antenna elements 111 of the subarray 110A that is at coordinates #1, and a shift amount θs #N is used for the antenna elements 111 of the subarray 110A that is at coordinates #N. In the following description, the shift amounts θs #1 to θs #N are referred to as shift amounts θs, when they are not distinguished from one another.

The control unit 157 controls amounts of phase shift for the N phase shifters 120, by using phase data for the angle θb that is equal to the elevation angle θa that is acquired by the elevation-angle acquiring unit 152, and the phase data is obtained by using multiple sets of phase data that are in association with facing distances $r_{FD}$ estimated by the distance estimating unit 154.

Here, the control unit 157 controls the shift amounts of the phases of the N phase shifters 120, using phase data for an angle θb that is equal to the elevation angle θa that is acquired by the elevation-angle acquiring unit 152, and the phase data for the angle θb is acquired among multiple sets of phase data by using multiple sets of phase data that correspond to facing distances rep that the distance estimating unit 154 estimates.

The memory 158 is an example of a storage. The memory 158 stores a program to be executed when the position deriving unit 151, the elevation-angle acquiring unit 152, and the control unit 157 perform processing. The memory 158 stores data to be used when the program is executed, data to be generated when the program is executed, and image data or the like that is acquired by the camera 140. The memory 158 also stores multiple sets of phase data for respective facing distances $r_{FD}$. In an example, for each of five facing distances $r_{FD}$ of 3 m, 4 m, . . . and 7 m, 141 sets of phase data are stored in one-degree increments for a range of angles θb from +70 degrees to −70 degrees. The memory 158 stores length data indicating a length between an upper end and a lower end of the marker 50A.

Hereinafter, a method for determining the elevation angle θa is described.

When the azimuth angle φ and the elevation angle θ are used, the elevation angle θa can be determined by Equation (1) below, in view of a geometric relationship between the position P1 and the position P1a.

[Math. 1]

$$\theta a = \frac{\pi}{2} - \tan^{-1}\left\{\frac{1}{\cos\phi}\tan\left(\frac{\pi}{2} - \theta\right)\right\} \qquad (1)$$

When Equation (1) is expanded, Equation (2) is obtained.

[Math. 2]

$$\tan\theta a = \cos\phi\tan\theta \qquad (2)$$

Here, when the elevation angle θ is sufficiently small, tan θ≈θ is given. When the azimuth angle φ is close to 90 degrees, cos φ≈1 is given. When the azimuth angle φ is close to 90 degrees, cos φ≈0 is given. In this case, Equation (2) can be transformed into Equation (3) below.

[Math. 3]

$$\theta a = \theta\cos\phi \qquad (3)$$

In other words, when the position of the power receiver 50B is not significantly deviated from the XZ plane, the elevation angle θa can be approximated as expressed by Equation (3).

As described above, when the focal length of the fisheye lens 141 is expressed as $f_L$, the radius vector r is expressed by Equation (4) below.

[Math. 4]

$$r = f_L\theta \qquad (4)$$

From Equations (3) and (4), the elevation angle θa can be expressed by Equation (5) below.

[Math. 5]

$$\theta a = r\cdot\cos\phi/f_L \qquad (5)$$

With this approach, the elevation angle θa can be approximately determined using Equation (5).

Figure 4:
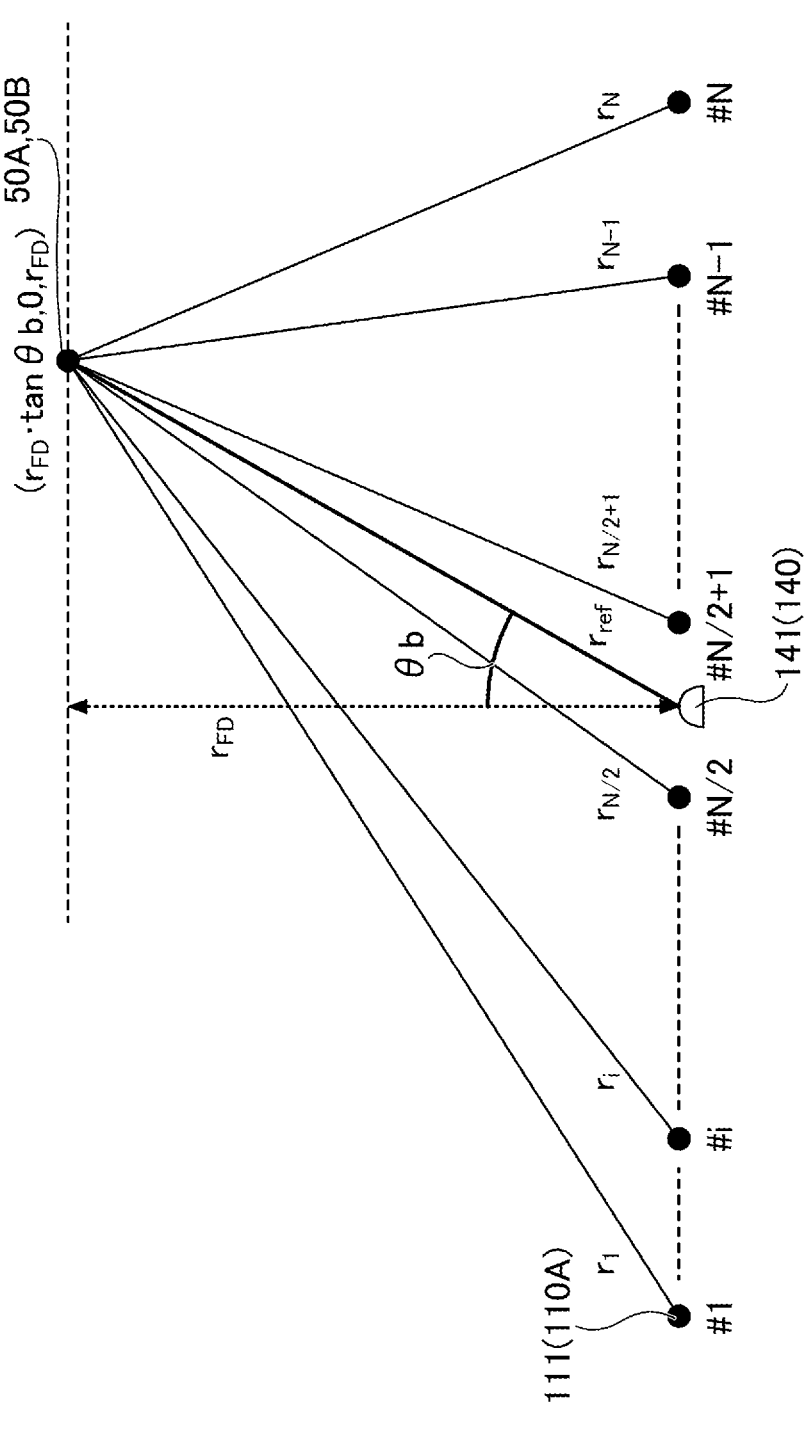
FIG. 4 is a diagram for describing an approach to determine phase data.

Hereinafter, the method for determining the phase data will be described. FIG. 4 is a diagram for describing an approach to determine the phase data. FIG. 4 illustrates the fisheye lens 141 of the camera 140, the marker 50A, the power receiver 50B, and the N antenna elements 111. Each antenna element 111 is a given antenna element of four antenna elements 111 that are included in each of the N subarrays 110A. The position of the marker 50A is the same as the position of the power receiver 50B.

As illustrated in FIG. 4, distances between N subarrays 110A and the marker 50A are respectively given as r1 to rN. Here, in order to simplify the description, it is assumed that there is no positional deviation between the camera 140 and the marker 50A in the Y-axis direction. The center of the 4N antenna elements 111 coincides with the origin of the XYZ coordinate system, and thus coordinates of the center of the 4N antenna elements 111 are expressed as (X,Y,Z)=(0,0,0). In addition, there is no positional deviation between the camera 140 and the marker 50A in the Y-axis direction, and the facing distance is given as rep. In this arrangement, the angle of the power receiver 50B that is obtained when viewed from the fisheye lens 141 is expressed as θb. The position of the power receiver 50B can be expressed as (X,Y,Z)=($r_{FD}$ tan θb,0,$r_{FD}$). Here, when the distance between the fisheye lens 141 and the power receiver 50B is expressed as $r_{ref}$, the distance $r_{ref}$ can be expressed by Equation (6) below.

[Math. 6]

$$r_{ref} = \sqrt{(r_{FD}\cdot\tan\theta b)^2 + 0^2 + r_{FD}^2} \qquad (6)$$

When the position of the i-th antenna element 111 among the N antenna elements 111 is expressed as (X,Y,Z)=($d_i$,0,0), a distance $r_i$ from an i-th antenna element 111 to the power receiver 50B can be expressed by Equation (7) below.

[Math. 7]

$$r_i = \sqrt{(r_{FD}\cdot\tan\theta b - d_i)^2 + 0^2 + r_{FD}^2} \qquad (7)$$

With this approach, a path difference $\tau_i$ between the distance $r_{ref}$ from the fisheye lens 141 to the power receiver 50B, and the distance $r_i$ from the i-th antenna element 111 to the power receiver 50B can be expressed by Equation (8) below.

[Math. 8]

$$\tau_i = r_i - r_{ref} \qquad (8)$$

The path difference $\tau_i$ is expressed in meters. In this case, when the path difference $\tau_i$ is converted into a wavelength $\lambda$ of a microwave to be used, a phase difference $\psi_i$ can be expressed by Equation (9).

[Math. 9]

$$\psi_{r_{FD},i}(\theta_b) = 2\pi \cdot \frac{\mathrm{mod}(\tau_i, \lambda)}{\lambda} \qquad (9)$$

$-\psi_{r_{FD}i}$ ($\theta b$) that is obtained by inverting a sign of the phase difference expressed by Equation (9) is given as a phase that is set for a given phase shifter 120 that is used in a case where the power is transmitted by the i-th antenna 111. It is sufficient when multiple sets of phase data used for multiple elevation angles $\theta a$ are prepared for the N subarrays 110A to be stored in the memory 158. Further, it is sufficient when the multiple sets of phase data for multiple facing distances $r_{FD}$ are prepared to be stored in the memory 158. With use of the multiple sets of phase data, the transmission power signals transmitted by the N subarrays 110A can reach the power receiver 50B in the same phase. The multiple sets of phase data for multiple angles $\theta b$ are expressed by Equation (10) below.

[Math. 10]

$$\psi_{r_{FD}}(\theta b) = \left\{ -\psi_{r_{FD},1}(\theta b), \dots, -\psi_{r_{FD},N}(\theta b) \right\} \qquad (10)$$

It is sufficient when the control unit 157 sets the shift amounts for the N phase shifters 120 that are coupled to the N subarrays 110A, respectively by using phase data indicating the angle $\theta b$ that corresponds to the elevation angle $\theta a$.

Figure 5:
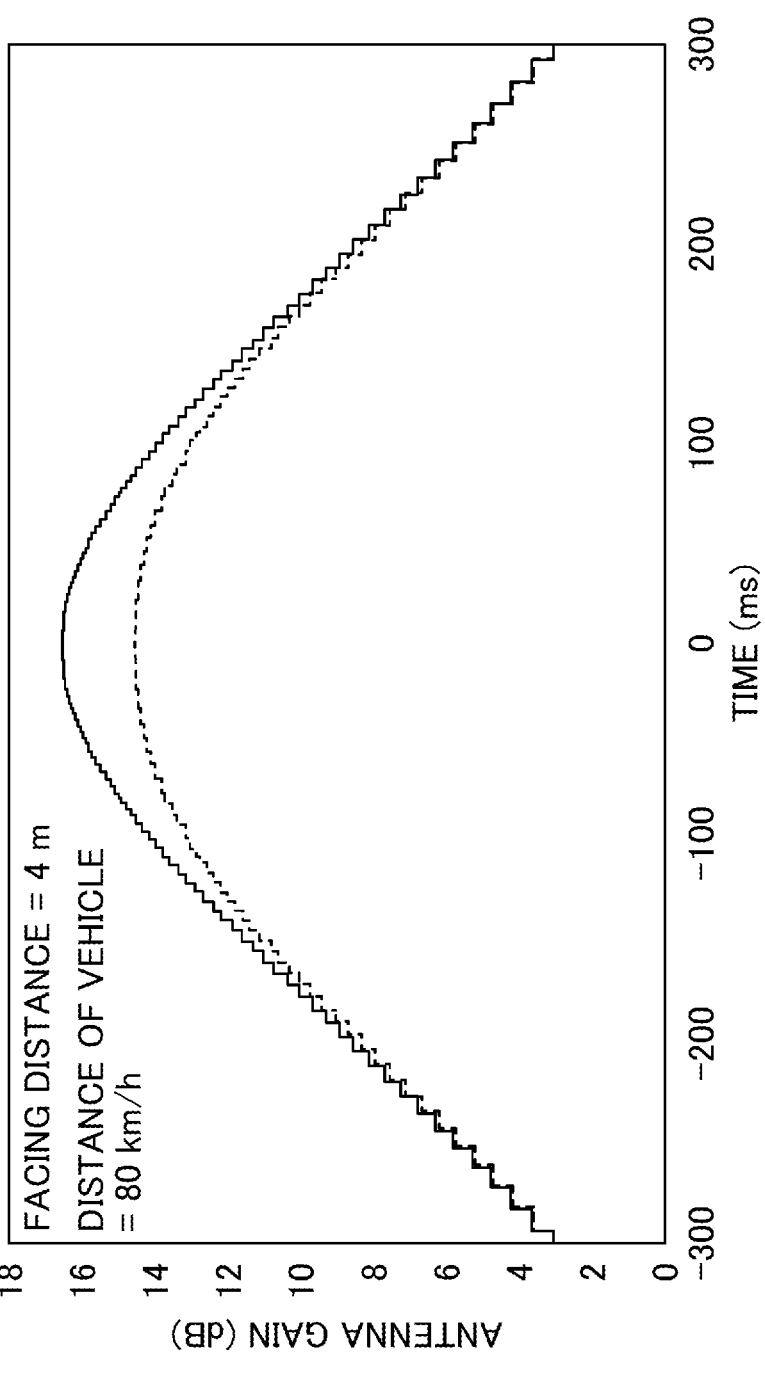
FIG. 5 is a diagram for describing antenna gains of an antenna device 100A and the feed device 100.

FIG. 5 is a diagram for describing effects of the antenna device 100A and the feed device 100. FIG. 5 illustrates the antenna gain that is obtained in a case where the power is received by the antenna of the power receiver, where the facing distance $r_{FD}$ is 4 m, and the speed of the vehicle on which the antenna device 100A and the feed device 100 are mounted is 80 km/h. The horizontal axis represents the time, where 0 seconds are the time at which the elevation angle $\theta a$ becomes 0 degrees, −300 seconds are the time at which the elevation angle $\theta a$ becomes +70 degrees, and +300 seconds are the time at which the elevation angle $\theta a$ becomes −70 degrees. That is, the time on the horizontal axis corresponds to the elevation angle $\theta a$.

In FIG. 5, a solid line expresses the antenna gain in a case where the shift amounts for the phase shifters 120 are adjusted using phase data that is obtained based on a facing distance and an elevation angle for each of the antenna device 100A and the feed device 100. A broken line expresses the antenna gain in a case where phase data that is obtained based on only an elevation angle is used for comparison. The antenna gain obtained based on only the elevation angle is an antenna gain obtained in the power receiver 50B, in a case where the shift amounts for the N phase shifters 120 that are coupled to the N subarrays 110A are each set to a value that corresponds to the elevation angle $\theta a$.

As illustrated in FIG. 5, the antenna gain that is obtained based on a given facing distance and a given elevation angle is larger than or equal to the antenna gain that is obtained based on only the elevation angle. A difference between the antenna gain obtained based on the given facing distance and the given elevation angle, and the antenna gain obtained based on only the elevation angle is increased as a time zone becomes closer to 0 seconds (in accordance with a decreasing absolute value of the elevation angle $\theta a$). As the elevation angle $\theta a$ becomes closer to 0 degrees, a distance between the N subarrays 110A and the power receiver 50B becomes shorter. As a result, it is considered that a remarkable effect of an individual phase control for the N subarrays 110A that is performed based on the facing distance and the elevation angle is obtained.

<Configuration of Marker 50A>

Figure 6:
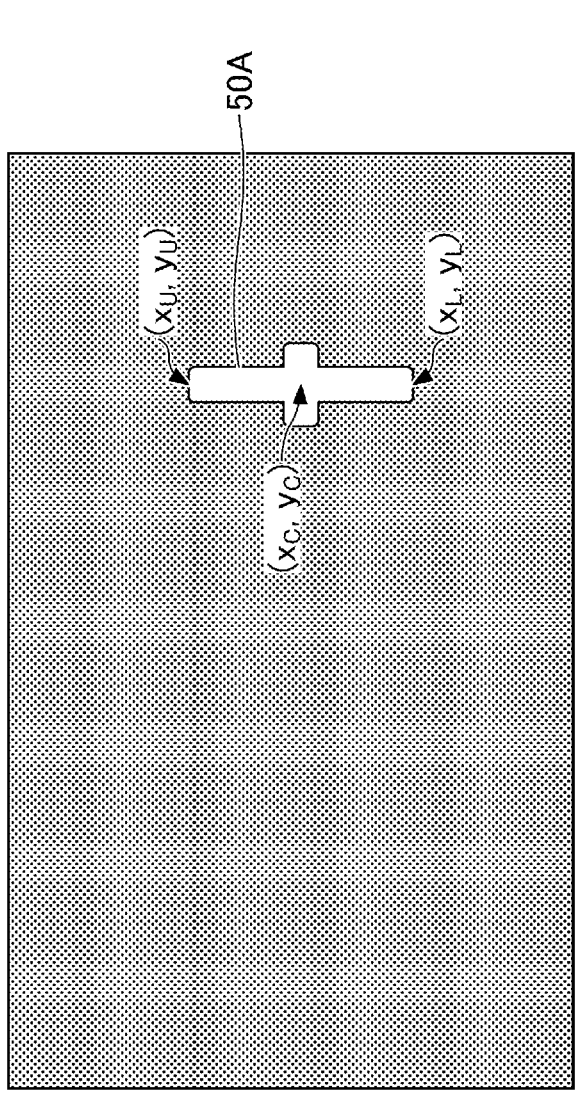
FIG. 6 is a diagram illustrating a marker 50A.
Figure 6:
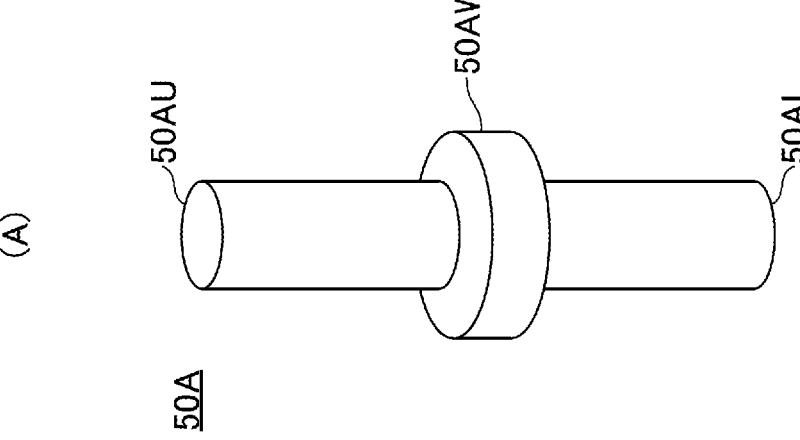

FIG. 6 is a diagram illustrating the marker 50A. A vertical direction in FIG. 6 expresses the vertical direction used when the marker 50A is provided. As illustrated in FIG. 6(A), the marker 50A has an upper end 50AU, a lower end 50AL, and a wide portion 50AW. The marker 50A includes, for example, a reflector that reflects an infrared ray by retroreflection (retroreflective action), and the entire front surface of the marker 50A can reflect the infrared ray.

The marker 50A has a vertically long (vertical) cylindrical shape, and has a configuration in which the wide portion 50AW has the widest (thickest) portion, and in which an upper end 50AU-side and a lower end 50AL-side are narrower than the wide portion 50AW. The vertical length of a portion that extends from the upper end 50AU to the wide portion 50AW is equal to the vertical length of a portion that extends from the lower end 50AL to the wide portion 50AW, for example. The marker 50A may be any marker as long as the marker 50A can reflect infrared light or visible light and coordinates of the upper end 50AU, the lower end 50AL, and a center of gravity of the marker can be acquired by image processing that the camera 140 performs. The configuration of the marker 50A is illustrated as an example.

FIG. 6(B) illustrates an example of pixel indexes that are obtained by the image processor 142A performing image processing such as binarization processing that is performed on image data that the capturing unit 142B acquires. In FIG. 6(B), the horizontal axis is an x-axis, and the vertical axis is a y-axis. The x-axis and the y-axis are the same as the x-axis and the y-axis of the plane 1 illustrated in FIG. 3, and the origin is the same as described above with regard to plane 1.

Pixel indexes identify the contour of the marker 50A. The coordinates of the upper end 50AU are expressed as $(x_U, y_U)$, the coordinates of the lower end 50AL are expressed as $(x_L, y_L)$, and the coordinates of the center of gravity of the marker 50A are expressed as $(x_C, y_C)$. The contour of the marker 50A is determined by the image processor 142B that performs a process of extracting the contour based on the distribution of the pixel indexes. Actual pixel indexes may include a small contour that is generated by noise or the like, in addition to including the contour of the marker 50A. For this reason, the contour of the marker 50A is determined by performing a process of determining the largest contour, i.e., obtaining the largest contour among multiple contours that are extracted based on the distribution of the pixel indexes. Further, the image processor 142B determines the coordinates of the upper end 50AU and the lower end 50AL, based on the contour of the marker 50A that is determined as the largest contour. The coordinates of the center of gravity are determined by the position deriving unit 151.

The reason why the marker 50A has the above configuration is because the positional deviation of the center of gravity with respect to the center (a vertical center and a center in a plan view) of the marker 142B is minimized when the position deriving unit 151 determines the center of gravity of the image of the marker 50A based on the pixel indexes that are output from the image processor 142B. Ideally, the position deriving unit 151 derives the center of the marker 50A as the center of gravity of the marker 50A.

The reason why the positional deviation of the center of gravity with respect to the center of the marker 50A is minimized is because the elevation angle θa is determined in the XZ plane with high accuracy, and the phase control is performed with high accuracy, by minimizing the deviation of the height in the Y-axis direction between the center of gravity of the marker 50A and the origin O in the polar coordinate system illustrated in FIG. 3.

Further, a facing distance Z in the Z-axis direction from the origin O to the marker 50A can be estimated in real time by using the coordinates of the upper end 50AU, the lower end 50AL, and the center of gravity of the marker 50A, and by using length data indicating the length of the marker 50A in the vertical direction. The fact that the facing distance Z can be estimated will be described below with reference to FIG. 7.

Although a case where the image processor 142B determines the coordinates of the upper end 50AU and the lower end 50AL of the marker 50A is described, the coordinates of the upper end 50AU and the lower end 50AL of the marker 50A may not necessarily determined. For example, when the reflector is provided at a portion that is offset downwardly with respect to the upper end of the marker 50A, coordinates of an upper end portion at which the reflector exists, of an upper end-side portion of the marker 50A may be used. Further, when the reflector is provided at a portion that is offset upwardly with respect to the lower end of the marker 50A, coordinates of a lower end portion at which the reflector exists, of a lower end-side portion of the marker 50A may be used. As length data indicating a vertical length of the marker 50A, length data indicating a length between the upper end portion and the lower end portion of the marker may be used.

<Method for Estimating Distance X and Facing Distance Z in Real Time>

Figure 7:
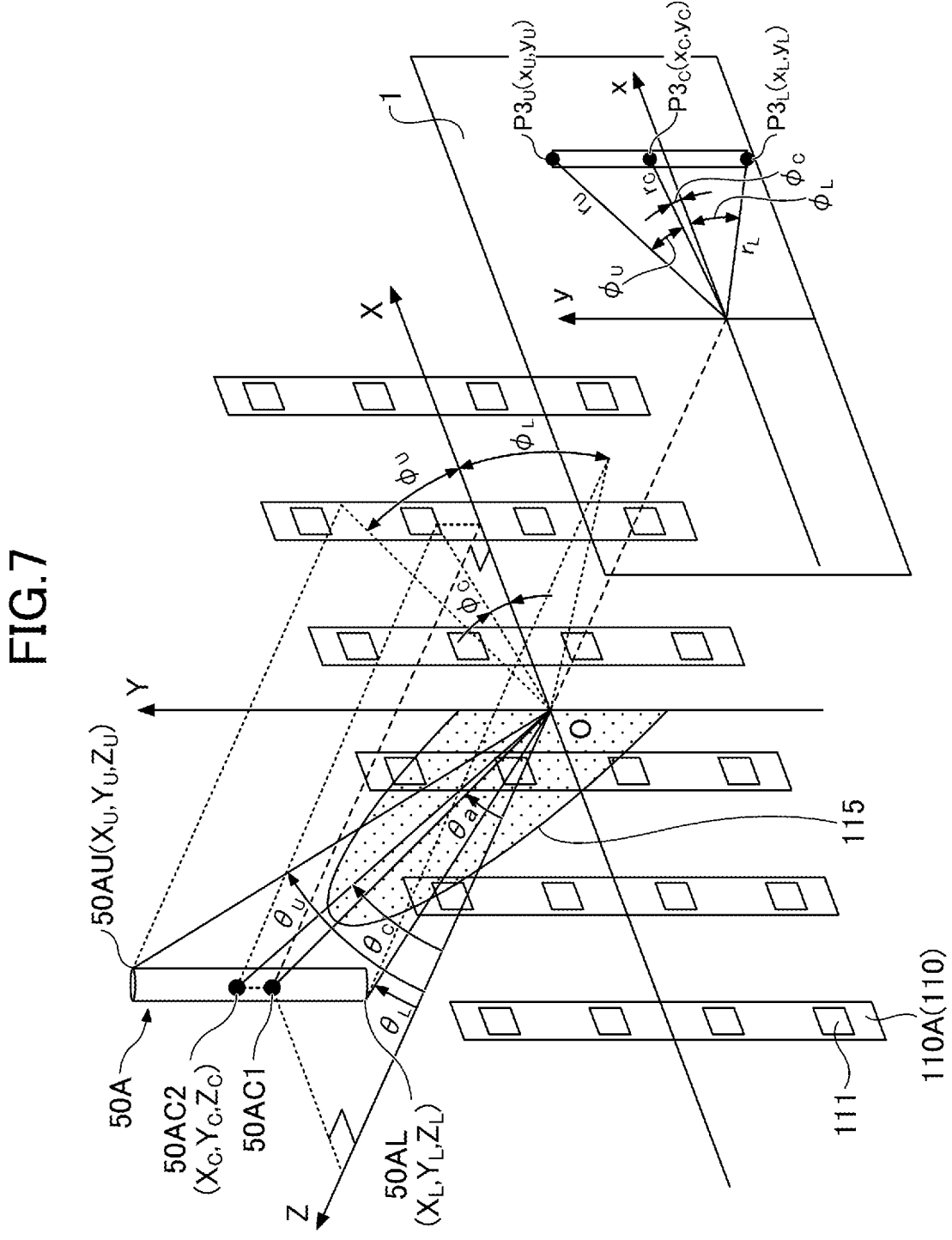
FIG. 7 is a diagram illustrating the polar coordinate system of the array antenna 110.

FIG. 7 is a diagram illustrating the polar coordinate system of the array antenna 110. A process of estimating the facing distance Z is performed by the controller 150. The method for estimating the facing distance Z is implemented by performing the process of estimating the facing distance Z.

As in FIG. 3, FIG. 7 illustrates the subarrays 110A of the array antenna 110, the antenna elements 111 included in each subarray 110A, and the beam 115 output from the array antenna 110. In addition to the above components, FIG. 7 illustrates a marker 50A. The marker 50A is configured such that a center 50AC1 and a center of gravity 50AC2 coincide with each other. However, the center of gravity 50AC2 that the position deriving unit 151 derives from the largest contour, which is identified by the pixel indexes, may be deviated from the center 50AC1. In view of the above situation, the center 50AC1 and the center of gravity 50AC2 are illustrated to be separate from each other in FIG. 7.

The Y-coordinate of the center 50AC1 of the marker 50A is given by Y=0. That is, the height of the center 50AC1 of the marker 50A in the Y-axis direction matches the height of the origin O in the XYZ coordinate system. In the XYZ coordinate system, coordinates of the upper end 50AU, the lower end 50AL, and the center of gravity 50AC2 of the marker 50A are respectively expressed as $(X, Y_U, Z)$, $(X, Y_L, Z)$, and $(X, Y_C, Z)$. The marker 50A extends in a direction parallel to the Y-axis, and thus, for each of the upper end 50AU, the lower end 50AL, and the center of gravity 50AC2, the same X-coordinate and the same Z-coordinate are used. In FIG. 7, the marker 50A is simplified and illustrated as a cylindrical body.

The polar coordinates of the upper end 50AU are expressed using an elevation angle $\theta_U$ and an azimuth angle $\varphi_U$, the polar coordinates of the lower end 50AL are expressed using an elevation angle $\theta_L$ and an azimuth angle $\varphi_L$, and the polar coordinates of the center of gravity 50AC2 are expressed using an elevation angle $\theta_C$ and an azimuth angle $\varphi_C$. The elevation angle $\theta_U$ is an example of a second elevation angle, and the elevation angle $\theta_L$ is an example of a third elevation angle. Further, positions that are obtained by projecting the upper end 50AU, the lower end 50AL, and the center of gravity 50AC2 onto a plane 1 are expressed by $P3_U$, $P3_L$, and $P3_C$, respectively. Also, xy-coordinates of the positions $P3_U$, $P3_L$, and $P3_C$ on the plane 1 are expressed as $(x_U, y_U)$, $(x_L, y_L)$, and $(x_C, y_C)$, respectively. Radius vectors that are derived from the positions $P3_U$, $P3_L$, and $P3_C$ are expressed by $r_U$, $r_L$, and $r_C$, respectively.

When the focal distance $f_L$ of the fisheye lens 141 and the elevation angle $\theta_C$ that is derived from the center of gravity 50AC2 are used, the radius vector $r_C$ derived from the center of gravity 50AC2 is expressed by $r_C = f_L\theta_C$. Further, when the radius vector $r_C$ and the azimuth angle $\varphi_C$ are used, xy-coordinates $(x_C, y_C)$ of the center of gravity 50AC2 are respectively expressed by $x_C = r_C \cos \varphi_C$ and $y_C = r_C \sin \varphi_C$. In this case, the coordinates $(x_C, y_C)$ of the center of gravity 50AC2 can be expressed by Equations (11) and (12) below.

[Math. 11]

$$x_C = f_L\theta_C\cos\phi_C \tag{11}$$

[Math. 12]

$$y_C = f_L\theta_C\sin\phi_C \tag{12}$$

When the elevation angle θa illustrated in Equation (3) is applied to the center of gravity 50AC2, Equation (13) below is given. Here, the reason why $\theta a = x_C/f_L$ is satisfied is because $r_C = f_L\theta_C$ is satisfied for the center of gravity 50AC2. The elevation angle θa is an example of a first elevation angle.

[Math. 13]

$$\theta a = \frac{1}{f_L}x_C = \theta_C\cos\phi_C \tag{13}$$

When XYZ-coordinates $(X, Y_U, Z)$ of the upper end 50AU are used, the elevation angle $\theta_U$ and the azimuth angle Du of the upper end 50AU can be expressed by Equations (14) and (15) below.

[Math. 14]

$$\theta_U = \tan^{-1}\frac{\sqrt{X^2 + Y_U^2}}{Z} \tag{14}$$

-continued

[Math. 15]

$$\phi_U = \tan^{-1}\frac{Y_U}{X} \tag{15}$$

When the focal distance $f_L$ of the fisheye lens 141 and the elevation angle $\theta_U$ of the upper end 50AU are used, the radius vector $r_U$ derived from the upper end 50AU is expressed by $r_U = f_L\theta_U$. Further, when the radius vector $r_U$ and the azimuth angle $\varphi_U$ are used, xy-coordinates $(x_U, y_U)$ of the upper end 50AU on the plane 1 are respectively expressed by $x_U = r_U \cos \varphi_U$ and $y_U = r_U \sin \varphi_U$. In this case, the coordinates $(x_U, y_U)$ of the upper end 50AU can be expressed by Equations (16) and (17) below.

[Math. 16]

$$x_U = f_L\theta_U\cos\phi_U \tag{16}$$

[Math. 17]

$$y_U = f_L\theta_U\sin\phi_U \tag{17}$$

Further, similar to the upper end 50AU, when XYZ-coordinates $(X, Y_L, Z)$ of the lower end 50AL is used, the elevation angle $\theta_L$ and the azimuth angle on of the lower end 50AL can be expressed by Equations (18) and (19) below.

[Math. 18]

$$\theta_L = \tan^{-1}\frac{\sqrt{X^2 + Y_L^2}}{Z} \tag{18}$$

[Math. 19]

$$\phi_L = \tan^{-1}\frac{Y_L}{X} \tag{19}$$

When the focal distance $f_L$ of the fisheye lens 141 and the elevation angle $\theta_L$ of the lower end 50AL are used, the radius vector $r_L$ for the lower end 50AL is expressed by $r_L = f_L\theta_L$. Further, when the radius vector $r_L$ and the azimuth angle $\varphi_L$ are used, xy-coordinates $(x_L, y_L)$ of the lower end 50AL on the plane 1 are respectively expressed by $x_L = r_L \cos \varphi_L$ and $y_L = r_L \sin \varphi_L$. In this case, the coordinates $(x_L, y_L)$ of the lower end 50AL can be expressed by Equations (20) and (21) below.

[Math. 20]

$$x_L = f_L\theta_L\cos\phi_L \tag{20}$$

[Math. 21]

$$y_L = f_L\theta_L\sin\phi_L \tag{21}$$

When Equations (15) and (19) are transformed, Equations (22) and (23) below are obtained.

[Math. 22]

$$Y_U = X \cdot \tan\phi_U \tag{22}$$

[Math. 23]

$$Y_L = X \cdot \tan\phi_L \tag{23}$$

By using the difference between Equation (22) and Equation (23), Equation (24) below is obtained.

[Math. 24]

$$Y_U - Y_L = X \cdot \{\tan\phi_U - \tan\phi_L\} \tag{24}$$

In this arrangement, a distance X in the X-axis direction between the center of the fisheye lens 141, which is the origin O of the XYZ coordinate system, and the center of gravity 50AC2 of the marker 50A can be estimated using Equation (24), as illustrated in Equation (25) below. A distance X in hat notation is an estimate value. The distance X identifies a component in the X-axis direction of a given distance between the center of the fisheye lens 141, which is the origin O of the XYZ coordinate system, and the center of gravity 50AC2 of the marker 50A.

[Math. 25]

$$\hat{X} = \frac{Y_U - Y_L}{\tan\phi_U - \tan\phi_L} \tag{25}$$

The center 50AC1 of the marker 50A is flush with the center of the fisheye lens 141, which is the origin O of the XYZ coordinate system, and for the Y coordinate ($Y_C$) of the center of gravity 50AC2, $Y_C \approx 0$ is satisfied. Further, when the Y-coordinate of the position P1 that is indicated by the elevation angle $\theta$ illustrated in FIG. 3 is set to 0 (Y=0), the elevation angle $\theta$ can be considered to be an elevation angle $\theta a$ that is obtained by projecting the elevation angle $\theta$ onto the XZ plane. In this arrangement, the facing distance Z in the Z-axis direction between the center of the fisheye lens 141, which is the origin O of the XYZ coordinate system, and the center of gravity 50AC2 of the marker 50A can be expressed by Equation (26) below. A facing distance Z in hat notation is an estimate value.

[Math. 26]

$$\hat{Z} = \frac{\hat{X}}{\tan\theta_{(Y=0)}} \approx \frac{\hat{X}}{\tan\theta a} \tag{26}$$

Here, a length $L_{PM}$ between the upper end 50AU and the lower end 50AL of the marker 50A is expressed by $Y_U - Y_L$, and thus Equation (27) below is obtained from Equation (26).

[Math. 27]

$$\hat{Z} \approx \frac{Y_U - Y_L}{\tan\theta a \cdot (\tan\phi_U - \tan\phi_L)} = \frac{L_{PM}}{\tan\theta a \cdot \left(\dfrac{y_U}{x_U} - \dfrac{y_L}{x_L}\right)} \tag{27}$$

Note that $Y_U$-$Y_L$ is also included in the numerator in Equation (25) for estimating the distance X. Thus, the distance X is estimated by substituting the length $L_{PM}$ into the numerator in Equation (25), and then by using the estimated distance X in hat notation and the elevation angle $\theta a$, a facing distance Z in hat notation may be determined from Equation (26).

The distance estimating unit 154 estimates the facing distance Z by using image data, and the facing distance Z in hat notation is an estimate value. When the elevation angle $\theta a$ is 0 degrees, the facing distance Z cannot be determined because values of $x_U$, $x_L$, and tan $\theta a$ become 0. In contrast, when the elevation angle $\theta a$ is a value other than 0 degrees, the facing distance Z can be determined in real time. The facing distance Z identifies a Z-component (distance in the Z-axis direction) of the distance between the center (the origin O of the XYZ coordinate system) of the array antenna 110 and the center of gravity 50AC2 of the marker 50A. The center (the origin O of the XYZ coordinate system) of the array antenna 110 is the same as the center of the fisheye lens 141.

When the feed device 100 mounted on the vehicle moves with respect to both the marker 50A and the power receiver 50B, a relative position of the marker 50A that is obtained when viewed from the feed device 100 changes from moment to moment. In this arrangement, the center of gravity 50AC2 of the marker 50A can be detected and tracked using image data of the marker 50A. However, the facing distance Z in hat notation is an approximately constant value. Thus, the facing distance Z may be estimated for each predetermined discrete angle (for example, 60 degrees, 50 degrees, 40 degrees, 30 degrees, and 20 degrees) of the elevation angle $\theta a$, then facing distances Z in hat notation that are estimated with respect to respective discrete angles are averaged, and finally the phase control may be performed using an average value of the facing distances Z in hat notation.

A distance Rref between the center (the origin O of the XYZ coordinate system) of the array antenna 110 and the power receiving antenna of the power receiver can be determined by Equation (28) below.

[Math. 28]

$$R_{ref} = \sqrt{\hat{X}^2 + Y^2 + \hat{Z}^2} \tag{28}$$

Here, the height of the center 50AC1 of the marker 50A matches the height of the origin O of the XYZ coordinate system, and thus it can be considered that Y=0 is satisfied in Equation (28). With use of Equation (28), a distance Ri between the antenna element 111 included in the i-th subarray 110A, among the N subarrays 110A, and the power receiving antenna of the power receiver can be expressed by Equation (29) below.

[Math. 29]

$$R_i = \sqrt{\left(\hat{Z}\tan\theta a - d_{i,x}\right)^2 + d_{i,y}^2 + \hat{Z}^2} \tag{29}$$

Here, in the XYZ coordinate system, $(d_{i,x}, d_{i,y})$ is expressed as XY-coordinates of the antenna element 111 included in the i-th subarray 110A. In each subarray 110A, transmission power signals in the same phase are respectively transmitted to antenna elements 111 arranged in the Y-axis direction, and there is no phase difference, where $d_{i,y}$=0 is set. A path length difference $\tau i$ between the distance Rref, which is from the center of the array antenna 110 to the power receiving antenna of the power receiver, and the distance Ri, which is from the antenna elements 111 included in the i-th subarray 110A to the power receiving antenna of the power receiver can be determined by Equation (30) below.

[Math. 30]

$$\tau_i = R_i - R_{ref} \tag{30}$$

In order to match the phases of transmission power signals that are from the antenna elements 111 included in the N subarrays 110A and that are received by the antenna of the power receiver 50, when a given facing distance Z in hat notation and a given elevation angle $\theta a$ are given, the phase of the transmission power signal transmitted to each antenna element 111 of the i-th subarray 110A is expressed by Equation (31) below.

[Math. 31]

$$\psi_{\hat{Z},i}(\theta a) = -2\pi\frac{\mathrm{mod}(\tau_i, \lambda)}{\lambda} \tag{31}$$

Here, $\lambda$ is a wavelength of the microwave used in the power transmission.

The phase expressed by Equation (31) is based on the same concept as described above with regard to the phase data, and the phase may be used instead of the phase data. The phase expressed by Equation (31) can be calculated in real time, and thus the phase control may be performed while performing the calculation in real time. When the phase is calculated using Equation (31), the control unit 157 may perform the calculation, for example. Further, the calculating of the phase is not necessarily performed in real time, where the calculation is performed based on some discrete facing distances Z in hat notation and elevation angles $\theta a$, then resulting values are stored in the memory 158, and finally the phase control may be performed by retrieving one or more phases in association with the estimated facing distances Z in hat notation and elevation angles $\theta a$ that are obtained in real time.

Figure 8:
FIG. 8 is a diagram illustrating a temporal change in power transmission efficiency obtained when the feed device 100 moves with respect to a power receiver 50B in an X-axis direction.
Figure 9:
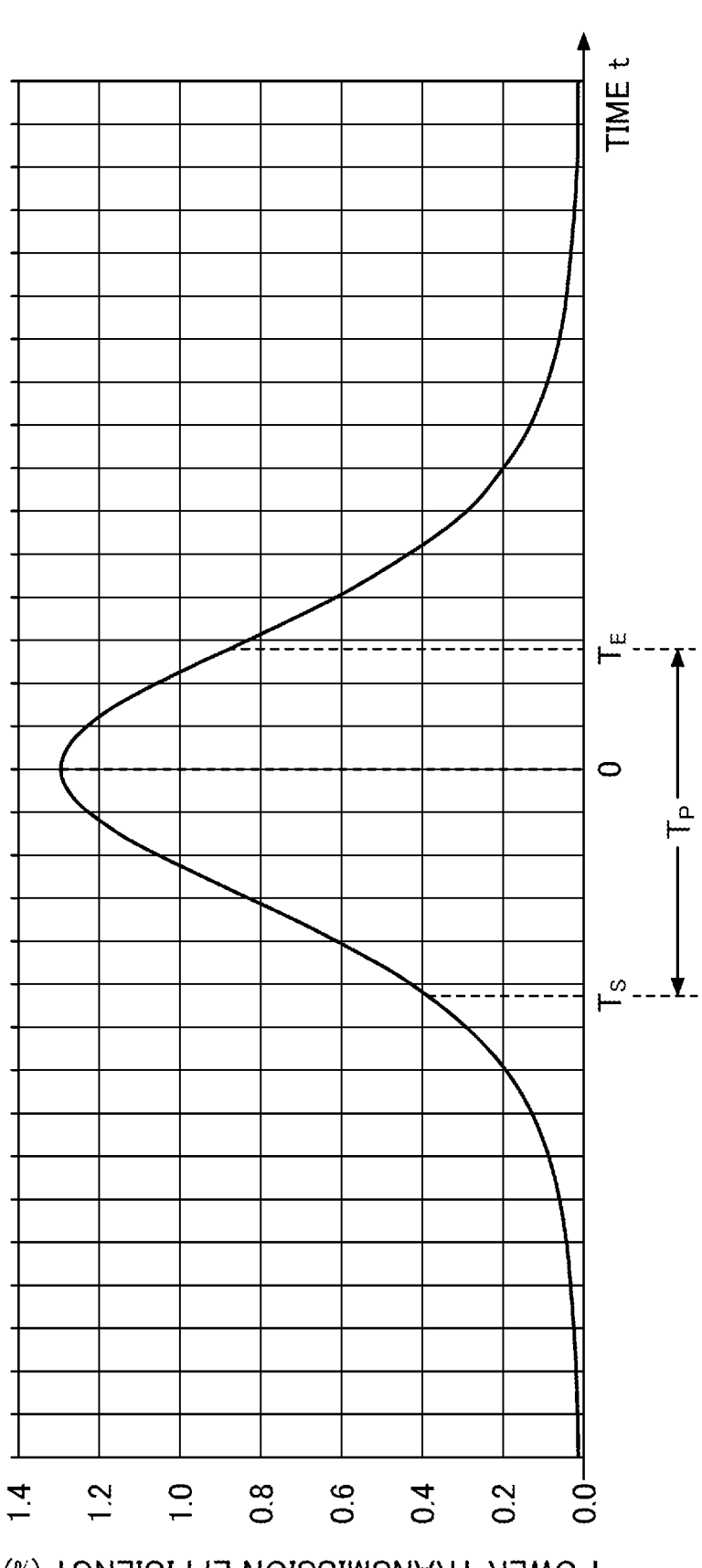
FIG. 9 is a diagram illustrating the temporal change in power transmission efficiency obtained when the feed device 100 moves with respect to the power receiver 50B in the X-axis direction.
Figure 10:
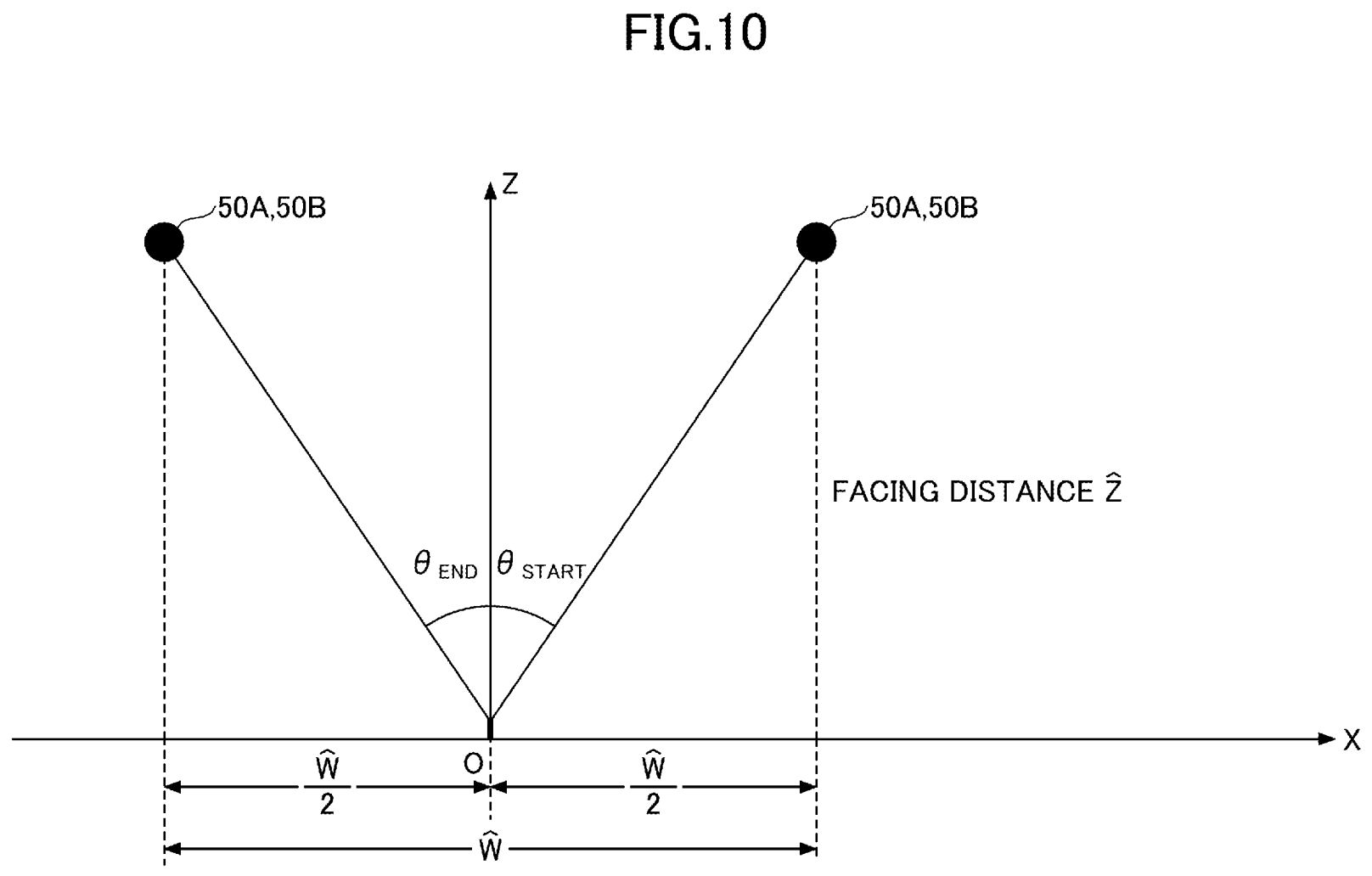

Hereinafter, a method for determining the power-transmitting start angle $\theta_{START}$ that is obtained at a timing at which power transmission is started will be described. In this example, the following description will be provided with reference to FIGS. 8 to 10 in addition to FIG. 7. FIGS. 8 and 9 are diagrams illustrating changes in power transmission efficiency over time when the feed device 100 moves in the X-axis direction toward the power receiver 50B. FIG. 10 is a diagram for describing the relation between the power-transmitting start angle $\theta_{START}$ and a travel distance W in hat notation.

Distances X in hat notation at times $t_1$ and $t_2$ are expressed by X in hat notation ($t_1$) and X in hat notation ($t_2$). The time $t_1$ is an example of a first time, and the time $t_2$ is an example of a second time. In view of deviations that are identified by X in hat notation ($t_1$) and X in hat notation ($t_2$), the travel speed v in hat notation for the feed device 100, obtained from time $t_1$ to the time $t_2$, can be expressed by Equation (32) below.

[Math. 32]

$$\hat{v} = \frac{\hat{X}_{(t_2)} - \hat{X}_{(t_1)}}{t_2 - t_1} \tag{32}$$

The travel speed v in hat notation is an estimate value of the travel speed of the feed device 100, with respect to time $t_1$ to time $t_2$, where the estimate value is determined from the distances X in hat notation ($t_1$) and X in hat notation ($t_2$). A time period from time $t_1$ to time $t_2$ is, for example, about 10 ms.

Here, it is necessary to reduce the effect of the power transmission signals on any other device that may exist around the power receiver 50B. In such a case, it is necessary that power having a time integral value of the power of the transmission power signals transmitted by the feed device 100 is suppressed to be less than or equal to predetermined power. The predetermined power is a power-upper limit that does not influence (interfere with) other devices. The control unit 157 limits a time period in which the power transmission signals are transmitted, such that when the transmission power signals influence a portable mobile station as any other device such as a cellular phone, a smartphone, or a transceiver, the power is set to the predetermined power or smaller that is obtained according to restrictions on the received power of the other device. Such restrictions may be specified, for example, by standardization or the like.

Here, a time period that is obtained by subtracting a predetermined margin time period from a transmission time period, during which the power of the power transmission signals reaches the power-upper limit is referred to as a duration, where the power-upper limit does not influence (interfere with) other devices. In the feed device 100, the power of the transmission power signals is suppressed to be smaller than or equal to the predetermined power, when a time period during which the transmission power signals can be transmitted is set to be shorter than or equal to the duration.

When the duration is expressed by $T_P$, the travel distance W in hat notation of the feed device 100 for the duration $T_P$ can be expressed by Equation (33).

[Math. 33]

$$\hat{W} = \hat{v} \cdot T_P = \frac{\hat{X}_{(t_2)} - \hat{X}_{(t_1)}}{t_2 - t_1} \cdot T_P \tag{33}$$

Here, for time varying characteristics of power transmission efficiency illustrated in FIGS. 8 and 9, the horizontal axis expresses the time, and the vertical axis expresses the power transmission efficiency (%). High power transmission efficiency shows an increased antenna gain for the power receiving antenna of the power receiver 50. In FIGS. 8 and 9, the time expressed by t=0 (0 seconds) is a time at which the elevation angle θa is 0 degrees. A time $T_S$ is a time at which power transmission is started, and a time $T_E$ is a time at which power transmission is terminated. A time period from the time $T_S$ to time $T_E$ is the duration $T_P$. The highest power transmission efficiency is obtained at time t=0 at which the elevation angle θa is 0 degrees, and the power transmission efficiency decreases as a given time point moves farther away from the time point identified by time t=0. This is similar to the case where in FIG. 5, the greatest antenna gain for the power receiving antenna of the power receiver 50 is obtained when the elevation angle θa is 0 degrees and the antenna gain decreases in accordance with an increasing absolute value of the elevation angle θa.

With this arrangement, as shown in FIG. 8, in order to set a timing that is at time t=0 at which the elevation angle θa becomes 0 degrees to be centered on the duration $T_P$, when power transmission is started at a timing that is $T_P/2$ earlier than the timing that is at time t=0, and then the power transmission is terminated at a timing that is $T_P/2$ later than the timing that is at time t=0, the largest received power by the power receiver 50 can be obtained.

In contrast, as shown in FIG. 9, when the timing that is at the time t=0 at which the elevation angle θa is 0 degrees is offset from the center of the duration $T_P$, the received power by the power receiver 50 is reduced, compared to the case where the power is transmitted for the duration $T_P$ shown in FIG. 8.

In view of the above situation, when power is transmitted for the duration $T_P$, as shown in FIG. 10, the power is transmitted in a case where a distance in the X-direction between the feed device 100 and the marker 50A becomes W/2 in hat notation. That is, if the speed of the vehicle for the duration $T_P$ is assumed to be constant, the duration $T_P$ and the travel distance W in hat notation are equally divided into halves, one half before and one half after a timing at which the marker 50A is present in front of the fisheye lens 141 and the elevation angle θa becomes 0 degrees.

The power-transmitting start angle $\theta_{START}$ that is obtained at the timing at which power transmission is started can be expressed by Equation (34) below.

[Math. 34]

$$\theta_{START} = \tan^{-1} \frac{\hat{W}/2}{\hat{Z}} \tag{34}$$

When the power-transmitting start angle $\theta_{START}$ determined by Equation (34) and the elevation angle θa obtained by Equation (13) are matched, the feed device 100 may start the power transmission, and when the duration $T_P$ passes after the power transmission is started, the feed device 100 may terminate the power transmission.

For the sake of description, FIG. 10 shows a power-transmitting end angle $\theta_{END}$ that is obtained when the power transmission is terminated. The duration $T_P$ and the travel distance W in hat notation are equally divided into halves, one half before and one half after the timing at which the elevation angle θa becomes 0 degrees, and in this case, the power-transmitting end angle $\theta_{END}$ is equal to the power-transmitting start angle $\theta_{START}$. As in the power-transmitting start angle $\theta_{START}$ and the elevation angle $\theta_a$, the power-transmitting end angle $\theta_{END}$ is an angle of the marker 50A with respect to the Z-axis, when viewed from the origin O of the XYZ coordinate system in the XZ plane. The feed device 100 may start the power transmission at a timing at which the elevation angle θa matches the power-transmitting start angle $\theta_{START}$. The feed device 100 may terminate the power transmission at a timing at which the duration $T_P$ passes. The feed device 100 does not need to control the timing at which the power transmission is terminated, by using the power-transmitting end angle $\theta_{END}$. In this description, the power-transmitting end angle $\theta_{END}$ is illustrated for the sake of explanation.

<Process of Estimating Facing Distance Z in Real Time>

Figure 11:
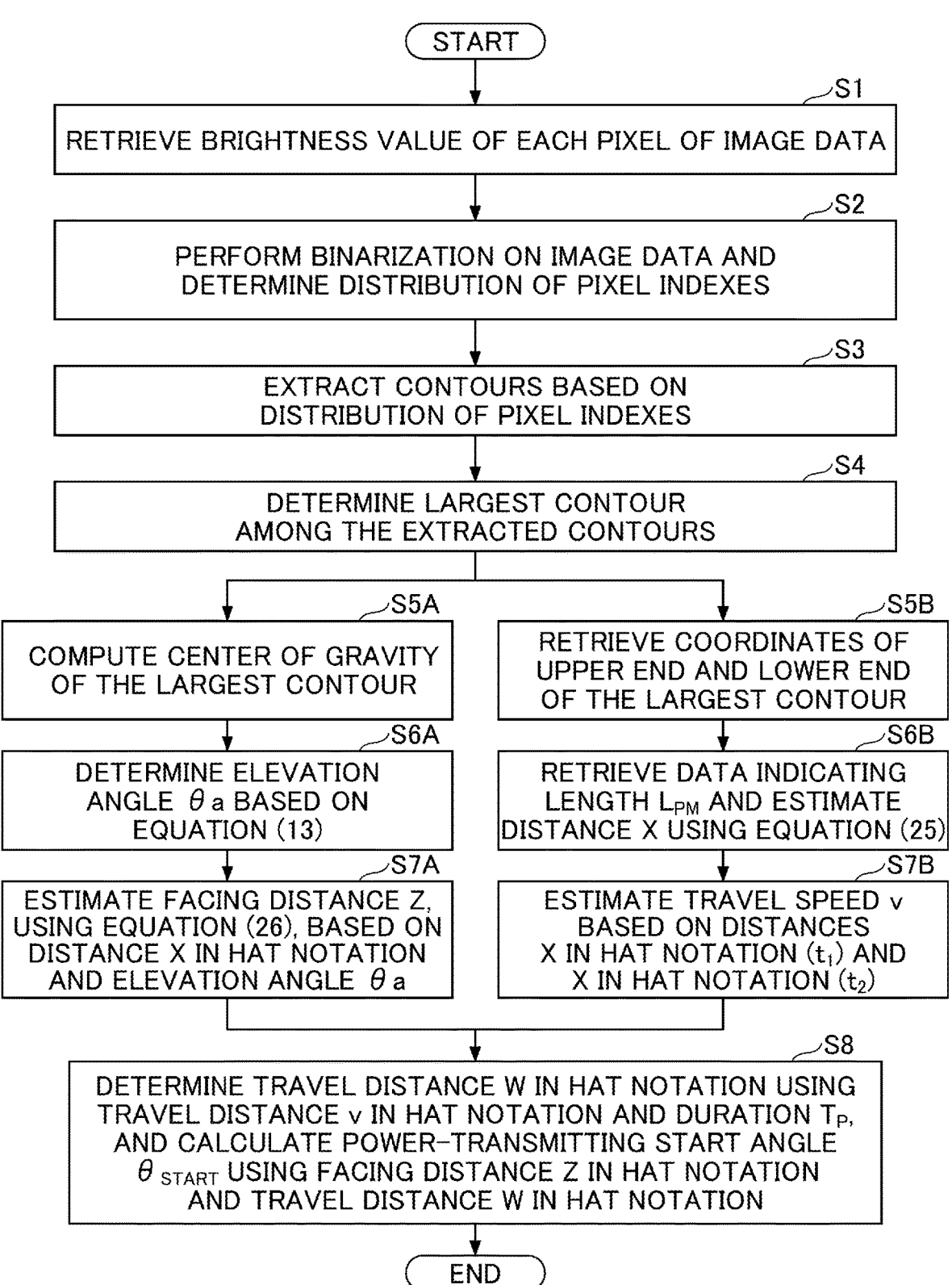
FIG. 11 is a flowchart illustrating a process of determining the power-transmitting start angle $\theta_{START}$.

FIG. 11 is a flowchart illustrating the process of determining the power-transmitting start angle $\theta_{START}$. When the process is performed, the image processor 142B retrieves a brightness value of each pixel of image data that is acquired by the capturing unit 142A (step S1).

The image processor 142B performs binarization on the image data acquired by the capturing unit 142A, and determines the distribution of pixel indexes (step S2).

The image processor 142B extracts one or more contours based on the distribution of pixel indexes (step S3).

The image processor 142B performs the process of determining the largest contour (largest contour) among the one or more contours that are extracted based on the distribution of the pixel indexes (step S4).

The position deriving unit 151 calculates the center of the largest contour that are derived from the pixel indexes that are determined by the image processor 142B (step S5A). With this approach, coordinates of the center of gravity 50AC2 of the marker 50A are obtained. The position deriving unit 151 uses the center of gravity of the largest contour as the coordinates of the center of gravity 50AC2. The image processor 142B retrieves the coordinates of the upper end and the lower end of the greatest contour, determined by the image processor 142B (step S5B). With this approach, the coordinates of the upper end 50AU and the lower end 50AL of the marker 50A are determined. The process in step S5B is simultaneously performed with step S5A. The image processor 142B respectively outputs the retrieved coordinates of the upper end and the lower end of the largest contour to the controller 150, as the coordinates of the upper end 50AU and the lower end 50AL of the marker 50A.

With use of an elevation angle $\theta_C$ and an azimuth angle $\varphi_C$ of the center of gravity 50AC2, the elevation-angle acquiring unit 152 determines the elevation angle θa based on Equation (13) (step S6A). The elevation angle $\theta_C$ and the azimuth angle $\varphi_C$ of the center of gravity 50AC2 may be determined based on coordinates $(x_C, y_C)$ of the center of gravity 50AC2.

The distance estimating unit 154 retrieves data indicating the length $L_{PM}$, from the memory 158, and estimates the distance X, using Equation (25) (step S6B).

With use of Equation (26), the distance estimating unit 154 estimates the facing distance Z based on a given distance X in hat notation and a given elevation angle θa (step S7A).

At time $t_1$ and time $t_2$, the speed estimating unit 155 acquires respective distances X in hat notion $(t_1)$ and X in hat notion $(t_2)$, estimated by the distance estimating unit 154, and thereby estimates the travel speed v of the feed device 100 in the X-axis direction with respect to the marker 50A, by using Equation (32) (step S7B).

With use of the travel speed v in hat notation, estimated by the speed estimating unit 155, and of the duration $T_P$, the angle estimating unit 156 determines the travel distance W in hat notation, from Equation (33), and further determines the power-transmitting start angle $\theta_{START}$ from Equation (34), using the facing distance Z in hat notation estimated by the distance estimating unit 154; and the travel distance W in hat notation (step S8).

Although not shown in FIG. 11, the control unit 157 may start power transmission when the power-transmitting start angle $\theta_{START}$ and the elevation angle θa obtained by Equation (13) coincide with each other. The control unit 157 may transmit the power for the duration $T_P$.

As described above, by using Equation (25) and by using the length $L_{PM}$ between the upper end 50AU and the lower end 50AL of the marker 50A, the distance estimating unit 154 can determine, in real time, the distance X in hat notation, which is a given X-axis direction component of the distance between the center of the fisheye lens 141, which is the origin O of the XYZ coordinate system, and the center of gravity 50AC2 of the marker 50A. The distance X is an estimate value of the X-coordinate of the center of gravity 50AC2 of the marker 50A when viewed from the origin O.

With this arrangement, the distance estimation device 100B, the antenna device 100A, the feed system, the feed device 100, and a feed method that can estimate the distance X between the power receiver 50B and the feed device 100 in real time can be provided.

At time $t_1$ and time $t_2$, the speed estimating unit 155 can estimate the travel speed v of the feed device 100 in the X-axis direction with respect to the marker 50A, based on the distances X in hat notation $(t_1)$ and X in hat notation $(t_2)$, estimated by the distance estimating unit 154 can be provided. In this arrangement, the antenna device 100A, the feed system, the feed device 100, and the feed method that are capable of estimating the travel speed v of the feed device 100 in the X-axis direction with respect to the marker 50A in real time. In addition, the travel speed v in hat notation is used, and thus the transmitting of the beam to the power receiver 50B that is at a position of the marker 50A can be started at a desired timing. For example, it is not easy for the antenna device 100A and the feed device 100 to obtain speed information from a speed sensor of the vehicle because the antenna device 100A and the feed device 100 need to obtain the speed information from a controller or the like that includes the speed information of the vehicle. In this respect, the antenna device 100A and the feed device 100 can estimate the travel speed v in the X-axis direction of the antenna device 100A and the feed device 100, which are mounted on the vehicle and move in the X-axis direction. With this arrangement, highly valuable information can be easily obtained.

The elevation-angle acquiring unit 152 can acquire the elevation angle θa in real time using Equation (13), and the distance estimating unit 154 can estimate the facing distance Z in real time using Equation (26), based on the elevation angle θa and the distance X in hat notation. In this arrangement, the antenna device 100A, the feed system, the feed device 100, and the feed method that are capable of estimating the distance Z between the power receiver 50B and the feed device 100 in real time can be provided.

The distance estimating unit 154 can estimate the distance X and the facing distance Z in real time, when the elevation angle θa is not in a predetermined angle range including 0 degrees. In this arrangement, when the elevation angle θa is not in a predetermined angle range including 0 degrees, the antenna device 100A, the feed system, the feed device 100, and a feed method that are capable of estimating the distance X and the facing distance Z in real time can be provided. The predetermined angle range is, for example, a range that is not suitable for the distance estimating unit 154 to determine the distance X in hat notation and the facing distance Z in hat notation, and the predetermined angle range is a predetermined range of elevation angles θa that are around 0 degrees.

The angle estimating unit 156 estimates the travel distance W, using the travel speed v in hat notation and the duration $T_P$, and determines the power-transmitting start angle $\theta_{START}$ based on the facing distance Z in hat notation and the travel distance W in hat notation. With this arrangement, when it is necessary to reduce the effect of the power transmission signals on any other device that may exist around the power receiver 50B, power received by the other device that may exist around the power receiver 50B can be suppressed to be smaller than or equal to predetermined power, and thus power transmission can be started at an appropriate timing. Further, by limiting a transmission time period to the duration $T_P$, there can be a reduced probability that radio waves interfere with any other device that may exist around the power receiver 50B.

As the power-transmitting start angle $\theta_{START}$ that is obtained at a timing at which power of the power transmission signals is transmitted, the angle estimating unit 156 estimates an angle with respect to the Z-axis of the XZ plane, where the angle is defined at a position at which a given travel distance W in hat notation from a position at which the elevation angle Ga is 0 degrees, and at the given travel distance W in hat notation is calculated as half (W/2 in hat notation) obtained for the duration $T_P$ for which the travel speed v in hat notation is adopted. In this arrangement, power received by any other device that may exist around the power receiver 50B can be suppressed to be smaller than or equal to predetermined power, and power transmission can be appropriately started at a timing that is at the beginning of the range of elevation angles θa at which the highest power transmission efficiency is obtained.

The duration $T_P$ is a time period during which power, which has an integral value of the power of the power transmission signals transmitted for the duration $T_P$, is smaller than or equal to predetermined power that is obtained according to restrictions on received power of any other device, other than the power receiver 50A, when the marker 50A arranged along the inner wall 51 is present in a space. In this arrangement, by starting power transmission at an appropriate timing and controlling a transmission time to be shorter than or equal to the duration $T_P$, received power of any other device that may exist around the power receiver 50B can be reliably suppressed to be smaller than or equal to predetermined power.

Further, the control unit 157 starts the power transmission of the power transmission signals when the elevation angle θa coincides with the power-transmitting start angle $\theta_{START}$, and thus the starting of the power transmission is easily controlled. Therefore, the power transmission can be reliably started at a timing at which the power is transmitted and that is determined based on the duration $T_P$.

Further, the marker 50A is longer in the vertical direction than in the horizontal direction, and thus the center of gravity of the marker 50A, which the position deriving unit 151 derives from the contour included in the pixel indexes, is likely to match the center of the marker 50A in the vertical direction. With this arrangement, the positional deviation of the center of gravity from the center can be reduced. As a result, the elevation angle θa can be determined with high accuracy, and the phase control can be performed with high accuracy.

The marker 50A has the wide portion 50AW at a middle portion in the vertical direction, and the position of the center of gravity of the marker 50A, which the position deriving unit 151 derives from the contours covered by the pixel indexes, can be guided to the center of the marker 50A. As a result, the elevation angle θa can be determined with high accuracy, and the phase control can be performed with high accuracy.

The wide portion 50AW is located at the middle portion of the marker 50A in the vertical direction, and thus the position of the center of gravity of the marker 50A, which the position deriving unit 151 derives from the contours covered by the pixel indexes, can be guided to the center of the marker 50A. As a result, the elevation angle θa can be determined with higher accuracy, and the phase control can be performed with higher accuracy.

Length data indicating a given length between the upper end 50AU and the lower end 50AL of the marker 50A is stored in the memory 158. In this arrangement, a given distance X in hat notation and a given facing distance Z in hat notation can be easily calculated.

The upper end portion and the lower end portion of the marker 50A refers to the upper end and the lower end of the marker 50A, respectively. In this arrangement, pixel indexes can be easily determined.

The memory 158 stores multiple sets of phase data, for respective facing distances $r_{FD}$, and the distance estimating unit 154 estimates facing distances $r_{FD}$. With this arrangement, shift amounts for the N phase shifters 120 that are coupled to the N subarrays 110A can be set using the multiple sets of phase data in association with the facing distances rep. Thus, by use of the multiple sets of phase data that correspond to distances to the power receiver 50B in the Z-axis direction, the antenna device 100A and the feed device 100 that are capable of transmitting the power such that the power receiver 50B can efficiently receive the power even in a case where the power receiver 50B is at a short distance can be provided. For example, in a case where multiple sets of phase data in association with facing distances $r_{FD}$ do not exist, it is sufficient when phase data in association with the closest facing distance $r_{FD}$ to an estimated facing distance $r_{FD}$ is used.

The multiple antenna elements 111 are grouped into multiple subarrays 110A each of which extends along the Y-axis direction, and the phase shifters 120 coupled to the respective subarrays 110A adjust phases of given transmission power signals, for each of the subarrays 110A. With this arrangement, the transmission power signals can be transmitted in the same phases to the power receiver 50B by the phase control in the X-axis direction. Further, the phase control is performed only by the phase control in the X-axis direction, and thus the phase control can be simplified.

When the elevation angle θa is in the predetermined angle range including 0 degrees, the distance estimating unit 154 converts the position P1 that is obtained by equidistant projection, into polar coordinates on a plane parallel to the XY plane, to thereby determine the position P2, as illustrated in FIG. 3. Subsequently, the distance estimating unit 154 can divide the X-coordinate (r·cos φ) of a mapped position P2a that is obtained by mapping the position P2 onto the X-axis, by the focal distance $f_L$ of the fisheye lens 141, to thereby determine the elevation angle θa ($=r\cdot\cos\varphi/f_L$).

Further, the control unit 157 may use the angle θb corresponding to the elevation angle θa to set shift amounts for the N phase shifters 120 that are coupled to the N subarrays 110A, respectively. If the shift amounts for the N phase shifters 120 are controlled using phase data that is set in accordance with changes in the elevation angle θa that is obtained in accordance with the movement of the antenna device 100A and the feed device 100, the transmission power signals to reach the power receiving antenna of the power receiver can be constantly transmitted in the same phases by the N subarrays 110A, while the antenna device 100A and the feed device 100 are moving.

When the elevation angle θa is in the predetermined angle range including 0 degrees, the positional deviation detector 153 detects a positional deviation between the camera 140 and the marker 50A in the Y-axis direction. When the positional deviation occurs, the distance estimating unit 154 retrieves, from the memory 158, data indicating the extent to which the number of pixel indexes varies with the positional deviation in the Y-axis direction, to estimate the facing distance $r_{FD}$ using the number of pixel indexes that is obtained by making a correction based on the extent to which the positional deviation in the y-axis direction occurs. With this arrangement, when the elevation angle θa is in the predetermined angle range including 0 degrees, in a case where the positional deviation between the camera 140 and the marker 50A occurs in the Y-axis direction, the control unit 157 can use multiple sets of phase data in association with facing distances $r_{FD}$ that are obtained by making estimation using a corrected number of pixel indexes. With this arrangement, the antenna device 100A, the feed system, the feed device 100, and a feed method can be provided to allow the power to be transmitted such that the power receiver 50B can efficiently receive the power even at a short distance that is a distance to a power receiver 50B in the Z-axis direction, even if the positional deviation between the camera 140 and the marker 50A occurs in the Y-axis direction.

In addition, the antenna device 100A and the feed device 100 control the elevation angle of the beam 115 output from the array antenna 110, only in the XZ plane. With this arrangement, the number of phase shifters 120 is one-fourth of that obtained in a case where the elevation angle is controlled using both the XZ plane and the YZ plane. Thus, the antenna device 100A and the feed device 100 can be made at low costs.

The above embodiments are described using a manner in which the center of the fisheye lens 141 coincides with the center of the 4N antenna elements 111. However, the center of the fisheye lens 141 may be deviated from the center of the 4N antenna elements 111. In this case, the coordinate origin used to compute the phase by array antenna control may be shifted by the deviation. Alternatively, the marker 50A and a given power receiving antenna may be provided so as to be separated from each other by the positional deviation between the marker 50A and the given power receiving antenna.

In addition, the embodiments are described using a manner in which the controller 150 includes the positional deviation detector 153. However, for example, when it is recognized that there is no positional deviation between the camera 140 and the marker 50A, the distance estimating unit 154 may not make corrections based on a positional deviation, without including the positional deviation detector 153 in the controller 150.

<Application Example of Feed Device 100 and Feed System 10>

Figure 12:
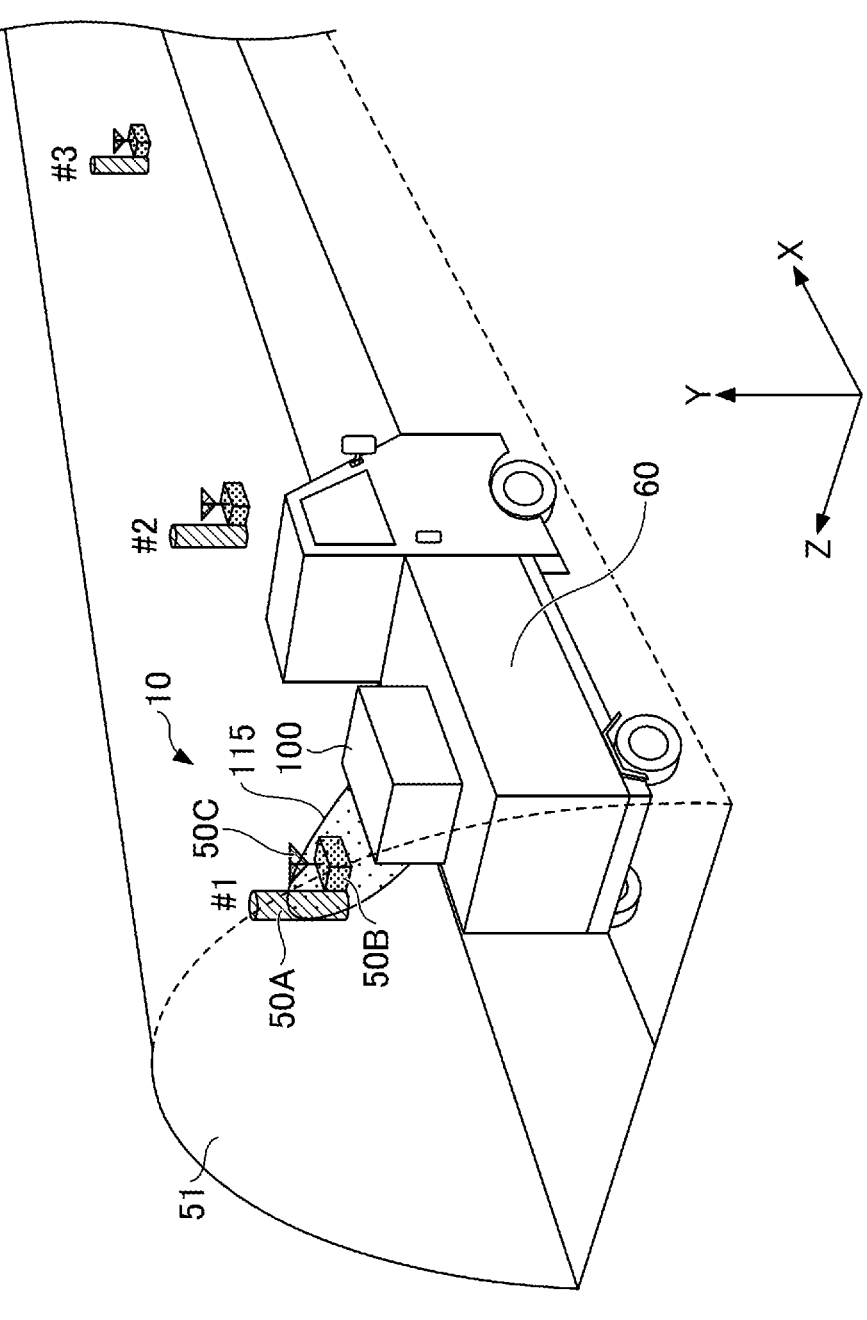
FIG. 12 is a diagram illustrating an application example of the feed device 100.

FIG. 12 is a diagram illustrating an application example of the feed device 100. The feed device 100 is mounted on a vehicle 60, for example. Each power receiving antenna 50C, which is used as a target, on an inner wall 51 of a tunnel. The marker 50A and the power receiver 50B are attached to the power receiving antenna 50C. The marker 50A is the marker 50A illustrated in FIG. 6(A), and the power receiving antenna 50C is arranged adjacent to the wide portion 50AW of the marker 50A. This is because the power can be efficiently received by the power receiving antenna 50C in order for the feed device 100 to emit the beam of the transmission power signals toward the center of gravity 50AC2 that is derived from image data of the marker 50A. A distance between the inner wall 51 of the tunnel and the vehicle 60 varies for each tunnel through which the vehicle 60 passes. In addition, when the vehicle 60 travels in a direction oblique to a travel lane, the distance between the inner wall 51 and the vehicle 60 may change from moment to moment.

Here, a system that includes the feed device 100, markers 50A, the power receiver 50B, and the power receiving antenna 50C is the feed system 10 according to the embodiments. The feed device 100 includes the antenna device 100A and the microwave generator 130, and the feed system 10 includes the antenna device 100A, the microwave generator 130, the marker 50A, the power receiver 50B, and the power receiving antenna 50C.

When the vehicle 60 travels in the positive X-axis direction, the feed device 100 converts the position of the marker 50A into polar coordinates on a plane parallel to the XY plane, by using the camera 140, and then divides an X-coordinate (r·cos θ) of a mapped position (mapped position corresponding to P2a) that is obtained by mapping a given position onto the X-axis, by the focal distance f; of the fisheye lens 141 to thereby determine the elevation angle θa (=r·cos φ/$f_L$). Also, the feed device 100 determines the facing distance Z in hat notation, based on the image data of the marker 50A and the length $L_{PM}$ of the marker 50A in the vertical direction, and then retrieves, from the memory 158, phase data corresponding to the facing distance Z in hat notation and the elevation angle θa to thereby control shift amounts for the N phase shifters 120. With this arrangement, transmission power signals in the same phases can be constantly transmitted from the N subarrays 110A to the power receiving antenna 50C of the power receiver 50B while the feed device 100 is moving. The transmission power signals in the same phases are emitted, as the beam, toward the power receiving antenna 50C. Instead of retrieving the phases from the memory 158, the feed device 100 may use the above-described Equation (9) to set, in real time, the phases of the transmission power signals to be transmitted from the N subarrays 110A.

When the elevation angle θa is in a predetermined angle range including 0 degrees, the distance estimating unit 154 may estimate the facing distance Imp from the center of the fisheye lens 141 to the marker 50A, based on the number of pixel indexes acquired by the image processor 142B. Also, the feed device 100 may estimate the facing distance Z for each predetermined discrete angle (for example, 60 degrees, 50 degrees, 40 degrees, 30 degrees, and 20 degrees) of the elevation angle θa, may average facing distances Z in hat notation that are obtained by estimating discrete angles, and then may perform the phase control using an average value of facing distances 2 in hat notation.

For example, the power receiving antenna 50C, a sensor that monitors the loosening of one or more bolts at a fixed portion, a rectenna, and a wireless communication module are provided at the fixed portion at which an infrastructural object such as a jet fan or a sign that is attached to the inner wall 51 of the tunnel is fixed. Further, when the beam is emitted by the feed device 100 toward the power receiving antenna 50C, while traveling in the vehicle 60, the rectenna that is coupled to the power receiving antenna 50C generates power to activate the wireless communication module.

Then, the wireless communication module emits a signal indicating an output of the sensor, and a vehicle 60-side receives the signal. With this arrangement, a fixed state of the infrastructural object can be inspected while the vehicle 60 is traveling.

In this case, the wireless communication module may receive a signal indicating the output of the sensor, through the array antenna 110.

The beam is controlled by determining an X-coordinate (r·cos φ) of a mapped position (mapped position that corresponds to P2a) that is obtained by performing mapping on the X-axis at the position of the power receiving antenna 50C, which is deviated from the XZ plane, and by using, as the elevation angle θa, a value (r·cos φ/$f_L$) that is obtained by dividing the X-coordinate (r·cos φ) by the focal distance $f_L$ of the fisheye lens 141. With this arrangement, even in a case where the vehicle 60 travels in either the positive or negative Y-axis after the X-axis travel, the elevation angle θa can be determined by avoiding the effect of the positional deviation.

Although the manner in which the feed device 100 (antenna device 100A) communicates with the wireless communication module provided on the inner wall 51 of the tunnel is described with reference to FIG. 12, the wireless communication module is not limited to a module provided on the inner wall 51 of the tunnel. The wireless communication module may be provided in various places or the like. In this arrangement, the feed device 100 (antenna device 100A) can be used as a communication device.

Although the distance estimation device, the antenna device, the feed system, the feed device, and the feed method according to the exemplary embodiments of the present invention are described above, the present invention is not limited to the specifically disclosed embodiments. Various modifications and changes can be made without departing from the scope of the claims.

This international application claims priority to Japanese Patent Application No. 2021-126777 filed Aug. 2, 2021, the entire contents of which are incorporated herein by reference.

DESCRIPTION OF SYMBOLS

50A marker
50B power receiver
50C power receiving antenna
100 feed device
100A antenna device
100B distance estimation device
110 array antenna
110A subarray
111 antenna element
120 phase shifter
130 microwave generator
140 camera
141 fisheye lens
150 controller
151 position deriving unit
152 elevation-angle acquiring unit
153 positional deviation detector
154 distance estimating unit
155 speed estimating unit
156 angle estimating unit
157 control unit
158 memory

The invention claimed is:

1. A distance estimation device comprising:
an image acquiring device configured to acquire an image through a fisheye lens; and
circuitry configured to
convert a first position of a marker that is included in the image, into a second position of polar coordinates on a first plane that includes a first axis and a second axis, the first position being used in the image acquiring device; and
estimate a distance between the image acquiring device and the marker,
wherein the circuitry is configured to:
estimate the distance between the image acquiring device and the marker in a first axis direction, based on
coordinates of an upper end portion of the marker, the coordinates being determined based on a second elevation angle and an azimuth angle of the upper end portion of the marker included in the image, the second elevation angle being relative to a third axis, and the azimuth angle being relative to the first axis,
coordinates of a lower end portion of the marker, the coordinates of the lower end portion being determined based on a third elevation angle and an azimuth angle of the lower end portion of the marker included in the image, the third elevation angle being relative to the third axis, and the azimuth angle of the lower end portion being relative to the first axis, and
a length between the upper end portion and the lower end portion.

2. The distance estimation device according to claim 1, wherein the circuitry is configured to:
estimate a travel speed of the image acquiring device in the first axis-direction with respect to the marker, based on a distance estimated at a first time and a distance estimated at a second time after the first time, the respective distances at the first time and the second time being estimated by the circuitry.

3. The distance estimation device according to claim 2, wherein the circuitry is configured to:
acquire, based on the second position, a first elevation angle of a projected position that is obtained by projecting the first position onto a second plane including the first axis and the third axis, the first elevation angle being relative to the third axis of the second plane,
wherein the circuitry is configured to estimate a distance between the image acquiring device and the marker in a third axis direction, based on the first elevation angle and the estimated distance in the first axis direction.

4. The distance estimation device according to claim 3, wherein upon occurrence of a condition in which the first elevation angle is not in a predetermined angle range including zero degrees, the circuitry is configured to
estimate the distance between the image acquiring device and the marker in the first axis direction, and
estimate the distance between the image acquiring device and the marker in the third axis direction, based on the first elevation angle and the estimated distance in the first axis direction.

5. The distance estimation device according to claim 4, wherein upon occurrence of a condition in which the first elevation angle is in the predetermined angle range including zero degrees, the circuitry is configured to estimate the distance between the image acquiring device and the marker in the third axis direction, based on the image.

6. The distance estimation device according to claim 5, wherein the circuitry is configured to:

detect a positional deviation between the image acquiring device and the marker in a second axis direction, based on a position of a center of gravity of the marker included in the image, wherein the circuitry is configured to estimate the distance between the image acquiring device and the marker in the third axis direction, based on the image that is obtained by making a correction in accordance with an extent to which the positional deviation is detected.

7. The distance estimation device according to claim 3, wherein the circuitry is configured to determine, as the first elevation angle, a value that is obtained by dividing coordinates of a mapped position by a focal length of the fisheye lens, the mapped position being obtained by mapping the second position onto the first axis.

8. The distance estimation device according to claim 7, wherein the coordinates of the mapped position are indicated by a value that is obtained by multiplying a radius vector used for the polar coordinates by a cosine of an argument.

9. The distance estimation device according to claim 1, wherein the upper end portion and the lower end portion are an upper end and a lower end of the marker, respectively.

10. An antenna device comprising:

the distance estimation device according to claim 1;

an array antenna including multiple antenna elements that are bidimensionally arranged along the first axis and the second axis;

a phase adjuster configured to adjust phases of transmission power signals that are respectively supplied by the multiple antenna elements, with respect to the first axis direction; and a control circuit configured to:

determine a timing at which transmission of the transmission power signals starts, based on the distance between the image acquiring device and the marker in the first axis direction, the distance in the first axis direction being estimated by the distance estimation device, and a duration during which power of the transmission power signals is transmitted, and control the phase adjuster.

11. An antenna device comprising:

the distance estimation device according to claim 3;

an array antenna including multiple antenna elements that are bidimensionally arranged along a first axis and a second axis;

a phase adjuster configured to adjust phases of transmission power signals that are respectively supplied by the multiple antenna elements, with respect to a first axis direction; and a control circuit configured to control the phase adjuster based on a first elevation angle and a distance in a third axis direction estimated by the distance estimation device, wherein at a starting timing at which power of transmission power signals is transmitted, the control circuit is configured to determine an angle that is defined using a position of the marker and the image acquiring device and that is relative to a third axis of a second plane, based on a travel speed estimated by the distance estimation device and a duration for which power of transmission power signals continues to be transmitted.

12. The antenna device according to claim 11, wherein the control circuit is configured to start power transmission upon occurrence of a condition in which the first elevation angle matches the determined angle.

13. The antenna device according to claim 11, wherein the control circuit is configured to:

estimate, as a power-transmitting start angle obtained at the starting timing at which the power of the power transmission signals is transmitted, a given angle, relative to the third axis of the second plane, the given angle being defined at a position that is before a position where the first elevation angle is 0 degrees, and that is obtained in a case where a distance of half a travel distance for the duration for which the travel speed estimated by the distance estimation device is adopted.

14. The antenna device according to claim 10, wherein the duration is a time period during which the power, having an integral value of the power of the transmission power signals transmitted for the duration, is smaller than or equal to predetermined power, the predetermined power being obtained according to a restriction on the power received by a device other than a power receiver that is at a position of the marker within a space where the marker arranged along a wall is present.

15. The antenna device according to claim 10, wherein the multiple antenna elements are grouped into multiple subarrays each of which extends along a second axis direction, and wherein the phase adjuster includes multiple phase shifters coupled to the respective subarrays and configured to adjust the phases of the transmission power signals for the respective subarrays.

16. A feed system comprising:

the antenna device according to claim 10;

a radio wave generator configured to supply the transmission power signals to the multiple antenna elements;

a power receiver at a position of the marker; and a marker attached to the power receiver, wherein the maker is longer in a vertical direction than in a lateral direction.

17. The feed system according to claim 16, wherein a middle portion of the marker includes a wide portion in the vertical direction.

18. The feed system according to claim 17, wherein the wide portion is located at a middle position in the vertical direction.

19. A feed device comprising:

an array antenna including multiple antenna elements that are bidimensionally arranged along a first axis and a second axis;

a radio wave generator;

a phase adjuster provided between the array antenna and the radio wave generator, and configured to adjust phases of transmission power signals that are respectively supplied from the radio wave generator to the multiple antenna elements, with respect to a first axis direction;

an image acquiring device configured to acquire an image through a fisheye lens; and circuitry configured to convert a first position of a marker that is included in the image, into a second position of polar coordinates on a first plane that includes the first axis and the second axis, the first position being used in the image acquiring device;

acquire, based on the second position, a first elevation angle of a projected position that is obtained by projecting the first position onto a second plane including the first axis and a third axis, the first elevation angle being relative to the third axis of the second plane;

estimate distances between the image acquiring device and the marker;

determine a timing at which transmission of the transmission power signals starts, based on the distance between the image acquiring device and the marker in the first axis direction, the distance in the first axis direction being estimated by the distance estimation device, and a duration for which power of the transmission power signals continues to be transmitted; and control the phase adjuster.

20. A feed method by a feed device including:

an array antenna including multiple antenna elements that are bidimensionally arranged along a first axis and a second axis;

a radio wave generator;

a phase adjuster provided between the array antenna and the radio wave generator, and configured to adjust phases of transmission power signals that are respectively supplied from the radio wave generator to the multiple antenna elements, with respect to a first axis direction;

an image acquiring device configured to acquire an image through a fisheye lens;

circuitry configured to convert a first position of a marker that is included in the image, into a second position of polar coordinates on a first plane that includes the first axis and the second axis, the first position being used in the image acquiring device; and acquire, based on the second position, a first elevation angle of a projected position that is obtained by projecting the first position onto a second plane including the first axis and a third axis, the first elevation angle being relative to the third axis of the second plane, the feed method comprising:

estimating a distance between the image acquiring device and the marker;

determining a timing at which transmission of the transmission power signals starts, based on the distance between the image acquiring device and the marker, estimated in the first axis direction, and a duration for which power of the transmission power signals continues to be transmitted, and controlling the phase adjuster.

* * * * *